United States Patent
Froelicher et al.

(10) Patent No.: US 12,206,758 B2
(45) Date of Patent: Jan. 21, 2025

(54) SYSTEM AND METHOD FOR PRIVACY-PRESERVING DISTRIBUTED TRAINING OF MACHINE LEARNING MODELS ON DISTRIBUTED DATASETS

(71) Applicant: Ecole Polytechnique Federale De Lausanne (EPFL), Lausanne (CH)

(72) Inventors: David Froelicher, Lausanne (CH); Juan Ramon Troncoso-Pastoriza, Lausanne (CH); Apostolos Pyrgelis, Bretigny-sur-Morrens (CH); Sinem Sav, Lausanne (CH); Joao Gomes De Sa E Sousa, Renens (CH); Jean-Pierre Hubaux, ST-Sulpice VD (CH); Jean-Philippe Bossuat, Lausanne (CH)

(73) Assignee: Ecole Polytechnique Federale De Lausanne (EPFL), Lausanne (CH)

( * ) Notice: Subject to any disclaimer, the term of this patent is extended or adjusted under 35 U.S.C. 154(b) by 190 days.

(21) Appl. No.: 17/998,120

(22) PCT Filed: May 8, 2020

(86) PCT No.: PCT/EP2020/062810
§ 371 (c)(1),
(2) Date: Nov. 7, 2022

(87) PCT Pub. No.: WO2021/223873
PCT Pub. Date: Nov. 11, 2021

(65) Prior Publication Data
US 2023/0188319 A1    Jun. 15, 2023

(51) Int. Cl.
*H04L 9/00* (2022.01)
*G06N 3/098* (2023.01)

(52) U.S. Cl.
CPC ............. *H04L 9/008* (2013.01); *G06N 3/098* (2023.01)

(58) Field of Classification Search
USPC .......................................................... 713/189
See application file for complete search history.

(56) References Cited

U.S. PATENT DOCUMENTS 10,628,403 B2 * 4/2020 Wu ..................... G06N 20/00
11,449,753 B2 * 9/2022 Sirdey .................. G06N 3/045
(Continued)

OTHER PUBLICATIONS

Liu Changchang et al., Secure Model Fusion for Distributed Learning Using Partial Homomorphic Encryption, Apr. 25, 2019, Advances in Databases and Information Systems, Lecture Notes in Computer Science, Lect.Notes Computer, Springer International Publishing, Cham, pp. 154-179, XP047507043, ISBN: 978-3-319-10403-4, retrived on Apr. 25, 2019.

(Continued)

*Primary Examiner* — Kambiz Zand
*Assistant Examiner* — Mahabub S Ahmed
(74) *Attorney, Agent, or Firm* — Hovey Williams LLP; Kameron D. Kelly

(57) ABSTRACT

A system for privacy-preserving distributed training of a global model on distributed datasets has a plurality of data providers being communicatively coupled. Each data provider has a local model and a local training dataset for training the local model using an iterative training algorithm. Further it has a portion of a cryptographic distributed secret key and a corresponding collective cryptographic public key of a multiparty fully homomorphic encryption scheme. All models are encrypted with the collective public key. Each data provider trains its local model using the respective local training dataset, and combines the local model with the current global model into a current local model. A data provider homomorphically combines current local models into a combined model, and updates the current global model based on the combined model. The updated (Continued)

global model is provided to at least a subset of the other data providers.

15 Claims, 11 Drawing Sheets

(56) References Cited

U.S. PATENT DOCUMENTS

| | | | |
|---|---|---|---|
| 11,455,573 B2* | 9/2022 | Das | G06N 20/00 |
| 2015/0193695 A1* | 7/2015 | Cruz Mota | H04L 63/1425 |
| | | | 706/12 |
| 2018/0336486 A1* | 11/2018 | Chu | G06N 20/00 |
| 2019/0392353 A1* | 12/2019 | Liu | G06N 5/01 |
| 2020/0044852 A1* | 2/2020 | Streit | G06N 3/08 |
| 2020/0050951 A1* | 2/2020 | Wang | G06N 20/00 |
| 2020/0125739 A1* | 4/2020 | Verma | H04L 9/008 |
| 2020/0242466 A1* | 7/2020 | Mohassel | G06F 21/6254 |
| 2020/0244707 A1* | 7/2020 | Silver | G06F 18/214 |
| 2020/0327252 A1* | 10/2020 | McFall | G06F 21/78 |
| 2020/0358599 A1* | 11/2020 | Baracaldo Angel | |
| | | | G06F 21/6227 |
| 2020/0372380 A1* | 11/2020 | Liu | G06F 18/23 |
| 2020/0412743 A1* | 12/2020 | Baracaldo Angel | G06N 20/10 |
| 2021/0012225 A1* | 1/2021 | Sathya | G06N 5/04 |
| 2021/0042628 A1* | 2/2021 | Zhou | G06N 3/044 |
| 2021/0097428 A1* | 4/2021 | Kozhaya | G06F 18/21 |
| 2021/0117780 A1* | 4/2021 | Malik | G06F 9/485 |
| 2021/0133636 A1* | 5/2021 | Zhang | G06N 3/086 |
| 2021/0135837 A1* | 5/2021 | Cheung | H04L 9/3066 |
| 2021/0141940 A1* | 5/2021 | Naqvi | G06F 21/602 |
| 2021/0150037 A1* | 5/2021 | Radhakrishnan | G06N 20/00 |
| 2021/0150269 A1* | 5/2021 | Choudhury | G06V 30/1985 |
| 2021/0158099 A1* | 5/2021 | Tuor | G06N 3/049 |
| 2021/0191759 A1* | 6/2021 | Fong | G06F 9/4881 |
| 2021/0194666 A1* | 6/2021 | Georgieva | H04L 9/008 |
| 2021/0304062 A1* | 9/2021 | Rajamoni | G06N 20/00 |
| 2021/0312336 A1* | 10/2021 | Sinn | G06N 3/084 |
| 2021/0342193 A1* | 11/2021 | Anand | G06F 9/5077 |
| 2021/0342677 A1* | 11/2021 | Dalli | G06N 3/082 |
| 2021/0350211 A1* | 11/2021 | Dalli | H04L 9/008 |
| 2022/0121884 A1* | 4/2022 | Zadeh | G06N 3/006 |
| 2023/0006979 A1* | 1/2023 | Gharibi | G06Q 30/0623 |
| 2023/0038071 A1* | 2/2023 | Shen | H04W 72/02 |

OTHER PUBLICATIONS

Search Report and Written Opinion dated Jan. 27, 2021, for related PCT Application No. PCT/EP2020/062810 filed May 8, 2020, 12 pages.

* cited by examiner

Protocol 1 Extended MapReduce Abstraction.

TRAINING: $S$ receives $QR$ from Querier and outputs $P(W_G^{(\cdot,g)})$

1: Each $DP_i$ has $(X^{(i)}, y^{(i)})$
2: DPs agree on $lp$, $g$, and $DP_R$
3: Each $DP_i \in S$ initializes $W^{(i,0)}$
4: for $j=1,\ldots,g$ do
5:    Each $DP_i \in S$ computes:
      $P(W^{(i,j)}) \leftarrow \text{Map}((X^{(i)}, y^{(i)}), P(W_G^{(\cdot,j-1)}), P(W^{(i,j-1)}))$
6:    Each $DP_i$ sends $P(W^{(i,j)})$ to $DP_R$
7:    $DP_R$ computes: $P(W^{(\cdot,j)}) \leftarrow C(P(W^{(i,j)})), \forall DP_i \in S$ 8:    $DP_R$ computes: $P(W_G^{(\cdot,j)}) \leftarrow \text{Red}(P(W_G^{(\cdot,j-1)}), P(W^{(\cdot,j)}))$ PREDICTION: $DP_R$ receives $P(X')$ from Querier and uses $P(W_G^{(\cdot,g)})$ to compute $P(y')$ that is sent back to the Querier

FIG. 5A

Protocol 2 MAP.

Each $DP_i$ outputs $\langle w^{(i,j)} \rangle \leftarrow \text{Map}((X^{(i)}, y^{(i)}), \langle w_G^{(\cdot,j-1)} \rangle, \langle w^{(i,j-1)} \rangle)$ 1: $\langle w^{(i,j,0)} \rangle = \langle w^{(i,j-1)} \rangle$
2: for $l=1,\ldots,m$:
3:    Select batch $(B, z)$ of $b$ rows in $(X^{(i)}, y^{(i)})$
4:    $\langle u[k] \rangle = \text{DM}(B[k,\cdot], \langle w^{(i,j,l-1)} \rangle)$, for $k = 1, \ldots, b$
5:    $\langle v[e] \rangle = \text{DM}(\alpha B[\cdot,e]^T, \sigma(\langle u \rangle))$, for $e=1,\ldots,c$
6:    $\mu[e] = \sum_{k=1}^{b} \alpha B[\cdot,e]^T I(z[k])$, for $e=1,\ldots,c$
7:    $\langle w^{(i,j,l)} \rangle = \langle w^{(i,j,l-1)} \rangle + \mu - \langle v \rangle - \alpha\rho(\langle w^{(i,j,l-1)} \rangle - \langle w_G^{(\cdot,j-1)} \rangle)$
8: $\langle w^{(i,j)} \rangle = \text{RR}(\langle w^{(i,j,m)} \rangle)$

FIG. 5B

Protocol 3 Activation Function $\sigma(\cdot)$.

Func. $\sigma(\langle u \rangle \text{ or } \langle U \rangle, t)$ returns the activated $\langle \sigma(u) \rangle$ or $\langle \sigma(U) \rangle$ 1: if $t$ is Linear then $\langle \sigma(u) \rangle = \langle u \rangle$
2: else if $t$ is Logistic then
3: $\quad \langle \sigma(u) \rangle = \text{apSigmoid}(u)$
4: else if $t$ is Multinomial, input is a matrix $\langle U_{c \times |cl|} \rangle$ then
5: $\quad \langle m \rangle = \text{apMax}(\langle U \rangle)$
6: $\quad$ for $\lambda \in cl$:
7: $\quad\quad \langle U'[\lambda, \cdot] \rangle = \langle U[\lambda, \cdot] \rangle - \langle m \rangle$
8: $\quad\quad \langle \sigma(U[\lambda, \cdot]) \rangle = \text{M}(\text{apSoftN}(\langle U'[\lambda, \cdot] \rangle), \text{apSoftD}(\langle U'[\lambda, \cdot] \rangle))$

FIG. 5C

Protocol 4 REDUCE.

$DP_R$ computes $\langle w_G^{(\cdot, j)} \rangle \leftarrow \text{Red}(\langle w_G^{(\cdot, j-1)} \rangle, \langle w^{(\cdot, j)} \rangle, \rho, \alpha)$ 1: $\quad \langle w_G^{(\cdot, j)} \rangle = (1 - \alpha\rho|S|)\langle w_G^{(\cdot, j-1)} \rangle + \alpha\rho \langle w^{(\cdot, j)} \rangle$

FIG. 5D

Protocol 5 PREDICTION.

$DP_R$ gets $\langle X'_{n' \times c} \rangle$ from Querier and computes $\langle y'_{n'} \rangle$ using $\langle w_G^{(\cdot, g)} \rangle$ 1: $\quad \langle y'[p] \rangle = \sigma(\text{M}(\langle X'[p, \cdot] \rangle, \langle w_G^{(\cdot, g)} \rangle))$, for $p = 0, \ldots, n'$
2: $\quad \langle y' \rangle_{pk'} = \text{DKeySwitch}(\langle y' \rangle, pk', sk)$

FIG. 5E

Protocol 6 Encrypted Polynomial Aprox. Evaluation $AF(\cdot)$.

Func. $AF(\langle u \rangle, d, r)$ outputs $\langle a \rangle$ the evaluated polynomial approx. of $\langle u \rangle$ 1: Choose the smallest $\omega$ such that $2^\omega > d$
2: Pre-compute the set $\{u_i\} = \{\langle u \rangle, \langle u^2 \rangle, \langle u^4 \rangle, \ldots, \langle u^{2^{\omega-1}} \rangle\}$
   inductively and call $\mathbf{paRecu}(r, d, \{u_i\})$
3: Function paRecu($r, d, \{u_i\}$):
4:   Choose the smallest $\omega$ such that $2^\omega > d$
5:   Find polynomials $q(\langle u \rangle)$ and $R(\langle u \rangle)$ with $\langle a \rangle =$
     $\langle u^{2^{\omega-1}} \rangle q(\langle u \rangle) + R(\langle u \rangle)$ such that $\langle a \rangle = \sum_{i=1,3,\ldots,d} r[i] \langle u^i \rangle$
6:   If $d(q), d(R) \leq 2$:
       Evaluate $q(\langle u \rangle) = \mathbf{paRecu}(r, d = d(q), \{u_i\})$
       and $R(\langle u \rangle) = \mathbf{paRecu}(r, d = d(R), \{u_i\})$
7:   Else Return $\langle a \rangle$

FIG. 5F

Protocol 7 Approximation of the max function $\mathrm{apMax}(\cdot)$.

$\langle m \rangle \leftarrow \mathrm{apMax}(\langle U \rangle, [a_i, g_i], d)$

1: $\langle u' \rangle = \sum_{\lambda=0}^{|cl|} \langle U[\lambda, \cdot] \rangle$
2: for $\lambda = 1, \ldots, |cl|$: $\langle U[\lambda, \cdot] \rangle = (\langle U[\lambda, \cdot] \rangle - \langle u'[\lambda, \cdot] \rangle)$
3: $r \leftarrow \mathrm{GetAFCoefficients}((1/h') e^{(x/h)}, [a_1, g_1], d[1])$, where $h, h'$ are predefined constants
4: for $\lambda = 1, \ldots, |cl|$: $\langle U''[\lambda, \cdot] \rangle = AF(\langle U[\lambda, \cdot] \rangle, d[1], r)$
5: $\langle o \rangle = \sum_{\lambda=0}^{|cl|} \langle U''[\lambda, \cdot] \rangle$
6: $r' \leftarrow \mathrm{GetAFCoefficients}(\{1/x\}, [a_2, g_2], d[2])$
7: $\langle o \rangle = AF(\langle o \rangle, d[2], r')$
8: for $\lambda = 1, \ldots, |cl|$: $\langle \sigma(U[\lambda, \cdot]) \rangle = M(\langle \sigma(U_i) \rangle, \langle U''[\lambda, \cdot] \rangle)$
9: $\langle m \rangle = \sum_{\lambda=0}^{|cl|} (\langle \sigma(U[\lambda, \cdot]) \rangle, \langle o \rangle)$

| | |
|---|---|
| Encrypt: | $\langle v \rangle_{pk} = \{\{\langle v \rangle, \tau, \Delta\}, L, \Delta\}_{pk} = \text{Enc}(pk, v)$ |
| Decrypt: | $v = \text{Dec}(sk, \langle v \rangle_{pk})$ |
| Add: | $\{\langle v_1 \rangle + \langle v_2 \rangle, \min(\tau, \tau'), \max(\Delta, \Delta')\} =$ |
| | $\{\langle v_1 \rangle, \tau, \Delta\} + \{\langle v_2 \rangle, \tau', \Delta'\}$ |
| Mult: | $\{\langle v_3 \rangle, \min(\tau, \tau'), \Delta\Delta'\} = M(\{\langle v_1 \rangle, \tau, \Delta\}, \{\langle v_2 \rangle, \tau', \Delta'\})$ |
| Rot: | $\{\langle v' \rangle, \tau, \Delta\} = \text{RotL/R}(\{\langle v \rangle, \tau, \Delta\}, r, evk)$ |
| Rescale: | $\{\langle v \rangle, \tau - 1, \Delta'\} = \text{ReScale}(\{\langle v \rangle, \tau, \Delta\})$ |
| Relin: | $\{\langle v \rangle, \tau, \Delta\} = \text{Relin}(\{\langle v \rangle, \tau, \Delta\}, evk)$ |
| Bootstrap: | $\{\langle v \rangle, \tau, \Delta\} = \text{Bootstrap}(\{\langle v \rangle, 0, \Delta\}, evk)$ |

| | |
|---|---|
| Distrib. Key Gen: | $pk, evks = \text{DKeyGen}(\{sk_i\})$ |
| Distrib. Key Switch: | $\langle v \rangle_{pk'} = \text{DKeySwitch}(\langle v \rangle_{pk}, pk', \{sk_i\})$ |
| Distrib. Bootstrap: | $\{\langle v \rangle, L, \Delta\} = \text{DBootstrap}(\langle v \rangle, \tau, \Delta, \{sk_i\})$ |
| Distrib. Decrypt: | $v = \text{DDec}(\langle v \rangle, \{sk_i\})$ |

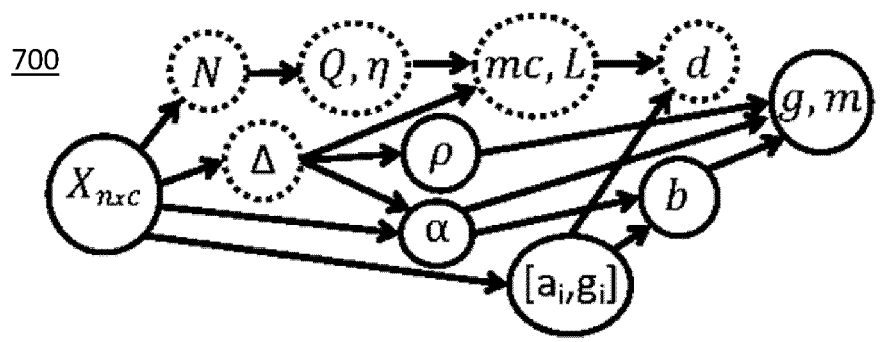

| Symbol | Description |
|---|---|
| $DP_i$ | $i^{th}$ Data provider |
| $S, |S|$ | Set of $DPs$ and its cardinality |
| $X_{n \times c}, y_n$ | Training dataset with $c$ features, $n$ samples, and label vector |
| $(X^{(i)}, y^{(i)})$ | $DP_i$'s part of the dataset |
| $(X', \cdot)$ & $y'$ | Querier's evaluation data and prediction's output |
| $cl, |cl|$ | Set of class labels and its cardinality |
| $X[\phi, \cdot], X[\cdot, \phi]$ | $\phi^{th}$ line and column of $X$ |
| $y[\phi]$ | $\phi^{th}$ element of vector $y$ |
| $B \in X$ | Random mini-batch of $b$ rows |
| $b$ | Size of the mini-batch |
| $W_G^{(\cdot, j)}$ | Global model at iteration $j$ |
| $W^{(i,j)}$ | $DP_i$'s local model at iteration $j$ |
| $w_G, w$ | Vector of global and local weights |
| $w^{(i,0)}$ | Initial local weights of $DP_i$ |
| $g, m$ | Number of global, local iterations |
| $lp$ | Learning parameters |
| $P(\cdot)$ | Protection mechanism |
| $QR$ | Querier request |
| $\sigma(\cdot)$ | Activation function |
| $d$ | Degree of the approximated function |
| $a_m$ | Multiplicative depth of $\sigma(\cdot)$ |
| $I(\cdot)$ | Indicator function |
| $n_i$ | The number of data samples per $DP_i$ |
| $P^2(x)$ | Next power of 2 of $x$ |
| $N_1, N_2$ | Diagonal approach parameters. $N_1 = P^2(\max(c,b))/N_2$ & $N_2 = \lfloor \sqrt{P^2(\max(c,b))} \rfloor$ |
| $\alpha, \rho$ | Learning and elastic rates |

FIG. 8B

| | |
|---|---|
| $sk, pk$ | Secret key and public key |
| $evk$ | Evaluation key |
| $\langle v \rangle$ | Encrypted vector $v$ |
| $|ct|$ | Size of fresh ciphertext $ct$ |
| $N$ | Ring dimension |
| $Q$ | Fresh ciphertext modulus |
| $L$ | Number of available levels |
| $\eta$ | Std. deviation of the noise distribution |
| $\Delta$ | Plaintext Scale |
| $mc$ | Chain of moduli variables |
| DM | Dot product |

SYSTEM AND METHOD FOR PRIVACY-PRESERVING DISTRIBUTED TRAINING OF MACHINE LEARNING MODELS ON DISTRIBUTED DATASETS

RELATED APPLICATIONS

This application is a national stage application, under 35 U.S.C. § 371 of International Patent Application No. PCT/EP2020/062810, filed on May 8, 2020 and published as WO 2021/223873 on Nov. 11, 2021, which is hereby incorporated by reference in its entirety.

TECHNICAL FIELD

The present invention generally relates to electronic data processing, and more particularly, relates to methods, computer program products and systems for improving data input by a user to modify configuration settings for physical entities.

BACKGROUND

The training of machine-learning (ML) models usually requires large and diverse datasets. In many domains, such as medicine and finance, assembling sufficiently large datasets has been proven difficult and often requires the sharing of data among multiple data providers (i.e. computer systems which are able to contribute data to such large and diverse datasets). This is particularly true in medicine, where patients' data are spread among multiple entities: For example, for rare diseases, one hospital might have only a few patients, whereas a medical study requires hundreds of them to produce meaningful results. Data sharing among many entities, which can be disseminated over multiple countries, is hence required. However, in such and many other situations, the secrecy of data has to be ensured which makes it particularly difficult to share.

Hence, it is very difficult to obtain sufficient data to train ML models that are key enablers in medical research, finance analysis, and many other domains where the secrecy of the underlying data is to be guaranteed. Prior art solutions have been proposed for secure predictions using pre-trained models. However, secure training of ML models, which is much more computationally demanding, is still a field with potential for improvement.

Some centralized solutions have been proposed which rely on homomorphic encryption (HE). They have the advantage of being straightforward to implement but require individual records to be transferred out of the control of their owners, which is contravening data secrecy/privacy requirements. Also, moving data to a central repository can result in a single point of failure. Secure multiparty computation solutions (SMC) proposed for this scenario often assume that the computing parties are honest-but-curious and non-colluding. These assumptions might not hold when the data are sensitive and/or when the parties have competing interests.

In contrast, homomorphic encryption-based (HE) or hybrid (HE and SMC) solutions, that assume a malicious threat model (e.g., Anytrust model in D. Wolinsky, H. Corrigan-Gibbs, B. Ford, and A. Johnson. Scalable anonymous group communication in the anytrust model. 2012), focus on limited ML operations (e.g., the training of regularized linear models with low number of features) and are not quantum-secure. In the publication of W. Zheng, R. A. Popa, J. E. Gonzalez, and I. Stoica. Helen: Maliciously secure coopetitive learning for linear models. In IEEE Symposium on Security and Privacy (S&P), 2019, a system is proposed that uses HE and verifiable secret sharing to execute alternating direction method of multipliers (ADMM), a convex optimization approach for distributed data, which supports regularized linear models. Recent advances in quantum computing have made this technology a potential threat for existing cryptographic solutions in a not so far future. Whereas the above Zhen et al. publication solely focuses on regularized linear models, the following references disclose systems using neural networks:

- P. Mohassel and Y. Zhang. SecureML: A system for scalable privacy-preserving machine learning. In 2017 IEEE Symposium on Security and Privacy (SP), pages 19-38, May 2017, describes a 2-server setting where the data owners process, and secret-share their data among two non-colluding servers that are responsible for training the machine learning model, combining secret-sharing and garbled circuits;
- P. Mohassel and P. Rindal. Aby 3: a mixed protocol framework for machine learning. In ACM Conference on Computer and Communications Security (CCS), 2018, extends the previous approach to three servers and a malicious adversarial setting; and
- S. Wagh, D. Gupta, and N. Chandran. SecureNN: 3-party secure computation for neural network training. Privacy Enhancing Technologies (PETS), 2019, proposes privacy-preserving secure neural network training on secret shared data over a 3-party setting without garbled circuits.

The aforementioned distributed approaches are practical only with a small number of parties and focus either on training or prediction. Moreover, they do not consider the complete ML workflow, nor enable the training of a model that remains secret and enables oblivious prediction on secret data. In many cases, the trained model is as sensitive as the data on which it is trained, and the use of the model after the training has to be tightly controlled. For example, entities that collaborate to train a ML model should all equally benefit from the resulting model, and its usage has to be controlled.

SUMMARY

There is therefore a need to provide systems and methods to enable privacy-preserving learning and prediction among multiple parties (data providers DPs) that do not trust each other to protect the secrecy of the underlying data and ML models.

This technical problem is solved by the features of the independent claims providing a solution that leverages the so-called MapReduce abstraction [cf., J. Dean and S. Ghemawat. MapReduce: simplified data processing on large clusters. Communications of the ACM, 2008] which can be used to define distributed ML tasks. MapReduce defines parallel and distributed algorithms in the following abstraction: PREPARE (data preparation), MAP (distributed computations executed independently by multiple nodes or machines), COMBINE (combination of the MAP results, e.g., aggregation) and REDUCE (computation on the combined results). Based on this abstraction the herein disclosed approach determines and delimits which information, e.g., MAP outputs, have to be protected to design a decentralized privacy-preserving system for ML training and prediction. The model is locally trained by the DPs (MAP) (i.e. the DPs locally perform some number of training iterations of the model learning process) and the results are iteratively combined (COMBINE) to update the global model (REDUCE). The partitioned (distributed) data is leveraged to enable DPs to keep control of their respective data, and the computation is distributed to provide an efficient solution for the training of ML models on confidential/secret data. After the training, the model is kept secret from all entities and is obliviously and collectively used to provide predictions on confidential/secret data that are known only to the entity requesting the prediction (that is, to the data consumer).

In one embodiment, a system for scalable privacy-preserving distributed learning (SPINDLE) is proposed that enables the privacy-preserving training of machine learning models such as so-called feed-forward neural networks. Feed-forward neural networks are composed of a pipeline of layers in which the first layer is called the Input Layer, the last one is the Output Layer and all the in-between layers are Hidden Layers (as their values are not observed in the training set). Feed-forward neural networks with more than one hidden layer are often referred to as deep neural networks. The layers are vectors of neurons, the input and output neurons simply input and output values respectively, whereas the neurons in the hidden layers define an activation function that processes the inputs and produces one scalar output per neuron. The feed-forward neural networks, as referred to herein, use hidden layers comprising only activation functions that can be approximated by a polynomial function. The neurons are connected by weighted links; the weight of a link multiplies the value that is sent from one neuron to the other. The goal of the neural network is to adapt these weights to capture a (possibly complex) relation between the input and the output. This can be done by training the neural network by using a training (labelled) dataset in which the outputs for specific inputs are known. The weights are iteratively adapted to capture this input-output relation while minimizing the error such that the network can then be used to predict outputs for non-labelled inputs.

The training of the feed-forward neural network can be performed with an iterative training algorithm. In general, multidimensional optimization algorithms can be used to train a feed-forward neural network, as part of the backpropagation algorithm (e.g., gradient descent, Newton, Conjugated gradient, Quasi-Newton, Levenberg-Marquardt, among others), which can be performed in batch or online mode. For example, a backpropagation algorithm based on the gradient descent may be used, in which each iteration comprises a forward and a backward pass. In the forward pass, the inputs are processed through the network to generate an output. The backpropagation algorithm can then be used to update the weights between all the layers by employing a method that can be based on the gradient descent. In principle, this iterative algorithm aims at reducing the error (the difference between the obtained output and the true (label) output) by finding the weights that correspond to the minimum of a loss function depending on this error. This is done by calculating the update on the weights based on the variation of the loss function. For example, this can be done efficiently by computing the gradient of the loss function and using the chain rule that links the layers backwards, from the output layer to the input layer.

In one embodiment, a Generalized Linear Model (GLM) can be defined as a neural network that comprises a single hidden layer made of one node that defines the activation function according to the GLM's type.

Such trained feed-forward neural networks can then make predictions for particular input data. For example, non-confidential predictions GLM (e.g., linear, logistic and multinomial logistic regressions) trained on a dataset distributed among a plurality of DPs are described by J. A. Nelder and R. W. M. Wedderburn (Generalized linear models. Journal of the Royal Statistical Society, 1972). SPINDLE ensures data and model confidentiality, as long as at least one-out-of-N DPs is honest-but-curious (or honest). It builds on a distributed (cooperative) instantiation of the widely-used stochastic mini-batch gradient descent (SGD), and a state-of-the-art multiparty, lattice-based, quantum-resistant cryptographic scheme.

While GLMs capture complex non-linear relations (e.g., logistic regression), and are widely-used in different domains such as engineering, healthcare, etc., building SPINDLE on SGD provides a widely-applicable system that can be further extended to other ML models using SGD for training the respective ML models. Examples of such other ML models are described in:

A. Kumar, J. Naughton, and J. M. Patel. Learning generalized linear models over normalized data. In ACM International Conference on Management of Data (SIGMOD), 2015, Du, Simon S., et al. "Gradient descent provably optimizes over-parameterized neural networks." arXiv preprint arXiv:1810.02054 (2018), T. Zhang. Solving large scale linear prediction problems using stochastic gradient descent algorithms. In International Conference on Machine Learning (ICML), 2004, and I. Goodfellow, Y. Bengio, and A. Courville. Deep Learning. MIT Press, 2016. http://www.deeplearningbook.org.

In a realistic scenario where a dataset of 11,500 samples and 90 features is distributed among 10 DPs, SPINDLE can efficiently train a logistic regression model in less than a minute, achieving an accuracy of 83.9% (i.e., the trained model predicted the correct label for 83.9% percent of the unlabeled data samples that it processed), comparable to a non-secure centralized solution. The distribution of the workload enables SPINDLE to efficiently cope with a large number of DPs (parties), as its execution time is practically independent of it. Moreover, it accommodates a large number of features, by optimizing the use of the cryptosystem's packing capabilities, leveraging single-instruction-multiple-data (SIMD) operations. This represents a notable improvement with respect to prior art secure solutions, such as, for example, the above-mentioned Helen system. Such prior art systems scale linearly with the number of parties, but combinatorially with the number of features, whereas SPINDLE's execution time is independent of the number of parties and increases better than linearly with the number of features.

In one embodiment, a computer-implemented method is provided for privacy-preserving distributed training of a global machine learning model on distributed datasets. The global machine learning model is referred to as global model herein. The distributed datasets together represent a global training dataset for the global model. Thereby, distributed dataset, as used herein, does not refer to a distribution of the global training dataset to different entities as a particular activity. Rather, it describes the distributed character of a plurality of independent local training datasets which altogether represent a virtual global training dataset.

The various training datasets are provided by a plurality of data providers which are communicatively coupled. The communicative coupling is implemented such that each data provider can exchange information with each other data provider of the plurality. However, this does not require a direct communication channel between a particular data provider and all remaining data providers. Rather, it is sufficient when two data providers can communicate via one or more of the other data providers.

Further, each of the data providers has a respective local machine learning model, referred to as local model herein. The respective local training dataset of the data provider is used for training the local model by using an iterative training algorithm (IA). For example, the machine learning models (global and local models) may be implemented by feed-forward neural networks with one or more hidden layers wherein the one or more hidden layers comprise only activation functions that can be approximated by a polynomial function. The used encryption scheme may limit the activation functions to polynomial functions. "Clear-text" systems (i.e. systems without encryption) are not bound to use polynomial activation functions. In such cases, the system can approximate the "clear-text" activations by polynomials.

Generalized Linear Models can be seen as a specific feed-forward neural network with a single hidden layer made of one node that defines an activation function according to a generalized linear model where the combination of a feature matrix X and a weights vector w is related to a vector of class labels y by the activation function a such that $E(y)=\sigma^{-1}(Xw)$, where $E(y)$ is the mean of y. Such GLMs can be of different types, such as for example: linear regression, logistic regression, and multinomial logistic regression. An iterative training algorithm example for such neural networks is a backpropagation algorithm based on the gradient descent, in which each iteration comprises a forward and a backward pass.

Further, each of the data providers has a portion of a cryptographic distributed secret key and a corresponding collective cryptographic public key of a multiparty fully homomorphic encryption scheme. Thereby, the local models of all data providers and the global model are encrypted with the collective public key. Optionally, also local training datasets may be encrypted with the collective public key. The cryptographic keys are collectively initialized by the plurality of data providers. The distributed secret key ensures that no data provider can ever decrypt any of the models if not all data providers having portions of the secret key provide their consent in accordance with the fully homomorphic encryption scheme.

In a preparation phase, all data providers have already agreed on a structure and data formats to which all the local models and the local training datasets adhere. Each data provider also has initialized its local model (e.g., with a random initialization). For example, the plurality of data providers may receive a request of a querying entity including the type of model to train, the set of features, and the label definition. In response to this request the (protected) global model $P(W_G)$, trained on the data providers' local training datasets is to be provided. Further, all data providers use the same training parameters (e.g., the maximum number of global iterations, the maximum number of local iterations, and the learning parameters $Ip=\{\alpha,\rho,b\}$, where $\alpha$ is the learning rate, $\rho$ the elastic rate, and b the batch size).

The predefined maximum number of global iterations is the agreed limit for performing global iterations, where each global iteration ends with an update of the global model such that it reflects the combined training status of the data providers' current local models. The number of global iterations which are actually performed can also be lower than the predefined maximum number of global iterations. For example, if a training level perceived as a sufficient training level is achieved, then the method may already stop global model updates after a lower number of global iterations when the sufficient training level is achieved.

With each global iteration, each data provider trains its own local model by using samples from the respective local training dataset (i.e. all or a subset of the local training dataset). Firstly, the data provider executes a predefined number of local iterations of gradient descent updates of its local model under homomorphic encryption. Secondly, it combines the resulting updated local model with the current global model into a current local model. In other words, the local model is updated by using a combination of the computed gradient and the difference between the local model and the global model multiplied by a pre-defined factor. Thereby, each data provider can always access the current (encrypted) global model. Either, each data provider may store a copy of the global model, or the global model is stored at a predefined storage location which can be accessed by each of the data providers. The current local model of a particular data provider reflects the training status of the local model of this particular data provider after the predefined number of local iterations. The local iterations may be performed by the various data providers in parallel substantially simultaneously. However, there is no requirement to execute the local training iterations in parallel. Once each data provider has executed the respective local iterations to arrive at the current local model, it provides its current local model to at least a subset of the data providers. In other words, each data provider can broadcast its current local model to all other data providers which would enable any data provider to perform the following steps for updating the global model, or the current local model is only sent to a subset of data providers performing the global model updating activities, which—in the extreme case—can be even a single data provider.

At least one data provider of the subset of data providers homomorphically combines at least a subset of the current local models into a combined model. In other words, the at least one data provider who belongs to the subset of data providers having received all or at least a subset of the current local models is now able to generate the combined model from the current local models of all or at least the subset of the data providers of the plurality of data providers. It is sufficient to perform the homomorphic combination by a single data provider. However, the combination can also be performed by any data provider of the subset.

The at least one data provider (i.e. the data provider(s) of the subset who performed the homomorphic combination) then updates the current global model based on the combined model. In other words, the global model is updated from its previous state based on the combined model computed by the data providers.

Finally, the at least one data provider provides the updated global model to at least a subset of the plurality of data providers. For example, the updated global model may be broadcast to some or all other data providers, or the updated global model may be provided at a predefined storage location from where it can be retrieved by the other data providers.

In one embodiment, the global model which has been trained (i.e. updated) based on the distributed training datasets as described above, can now be used to provide predictions in response to input data provided by a querying entity. The querying entity may be one of the data providers or it may be a further entity which is sending a corresponding query to one of the data providers. That is, a particular data provider of the plurality of data providers receives, from a querying entity (which can also be the particular provider itself), a request including input data which serves as an input to the global model for a prediction task. The received input data is encrypted with the collective public key which guarantees secrecy of the input data versus all data providers which are different from the querying entity. Further, the request includes a destination public key of a destination entity. The destination entity is the recipient of a prediction result to be provided by the global model in response to the input data. The destination entity is a computing device which can be the querying entity or it can be different from the querying entity. For example, the plurality of data providers may be computer systems of a plurality of hospitals which all train their local models with local datasets to predict a particular skin cancer disease from a respective image. The querying entity may be one of the hospital data providers or it may be a computer of a further hospital which is actually not forming part of the hospital data providers. The destination entity may be a computing device of a particular patient who is treated by the querying hospital. It may be advantageous that the result of the prediction can only be decrypted by the destination entity but not necessarily by the querying entity.

In response to the input data, each data provider can now obtain one or more corresponding encrypted prediction values by applying the encrypted global model to the encrypted input data (because each of the data providers has a copy of or at least access to the global or model). The one or more encrypted prediction values are the switched to the destination public key. This guarantees that only the destination entity can decrypt the one or more encrypted prediction values. The switched one or more encrypted prediction values are then provided to the querying entity.

In an alternative embodiment, the plurality of data providers being in possession of one or more destination public keys of one or more respective destination entities can collectively switch the global model (encrypted with the collective public key) to the one or more destination public keys and then provide the resulting one or more switched global models to the respective destination entities. Each destination entity can decrypt the received global model with the secret-key related to its own destination public key and thus obtain the corresponding decrypted global model. In this embodiment, a destination entity can then use the clear text global model in its own secure environment by feeding clear text input data into the model to retrieve clear text prediction results from the model. No encrypted query needs to be sent to any of the data providers. Nevertheless, the local models of the various data providers (and their respective local training datasets) remain entirely hidden from the destination entity.

In one embodiment, homomorphically combining the current local models is performed ascending a tree structure, such that each data provider aggregates its current local model with current local models of its children, and sends the aggregate result to its parent. This aggregation via the tree structure allows the data provider at the root of the tree structure (root data provider) to efficiently obtain the updated global model combined from all current local models. This embodiment implies that all data providers can directly communicate with each other through respective communication channels so that a tree structure can be formed dynamically to efficiently answer a query.

In one embodiment, a distributed computer system is provided for privacy-preserving distributed training of a global machine learning model—referred to as global model—on distributed datasets. The distributed computer system includes a plurality of data providers being communicatively coupled such that each data provider can exchange information with any other data provider. Each data provider has a respective local machine learning model—referred to as local model—and a respective local training dataset for training the local model using an iterative training algorithm, and further has a portion of a cryptographic distributed secret key and a corresponding collective cryptographic public key of a multiparty fully homomorphic encryption scheme. The local model is encrypted with the collective public key wherein the cryptographic keys are collectively initialized by the plurality of data providers. The local models and local training datasets of all data provider systems adhere to the same structure and data formats. All data providers use the same training parameters. The plurality of all local training datasets represents a global training dataset for the global model. The global model is also encrypted with the collective public key.

Each data provider is configured to perform training steps on its local model via the iterative training algorithm using the respective local training dataset by executing a predefined number of local iterations of gradient descent updates of its local model. Then, the updated local model is combined with the current global model into a current local model. The current local model is provided to at least a subset of the data providers.

At least one data provider of the subset of data providers is configured to homomorphically combine at least a subset of the current local models into a combined model, and to update the current global model based on the combined model. The updated global model is then provided to all other data providers of the plurality of data providers after a number of global iterations of global model updates which does not exceed a predefined maximum number of global iterations.

In one embodiment, the computer system is used for data prediction. In this embodiment, a particular data provider of the plurality of data providers is configured to receive, from a querying entity, input data encrypted with the collective public key, and to receive a destination public key of a destination entity (DE). The destination entity is the recipient of a prediction result to be provided in response to the input data. In response to the input data, the particular data provider obtains one or more corresponding encrypted prediction values by applying the encrypted global model to the encrypted input data, and switches the one or more encrypted prediction values to the destination public key. The switched one or more encrypted prediction values are then provided to the querying entity so that only the destination entity can decrypt the one or more encrypted prediction values.

The above described privacy-preserving distributed training and evaluation of ML models extends the widespread MapReduce abstraction with privacy constraints. SPINDLE implements this extended MapReduce abstraction in the form of an operational and efficient distributed system that enables the privacy-preserving execution of a complete machine-learning workflow, including data preparation, learning, and prediction for generalized linear models, on a dataset that is distributed among many data providers.

The herein disclosed optimizations enable efficient use of a quantum-resistant or quantum-secure cryptographic scheme by relying on parallel computations, SIMD operations, and optimized polynomial approximations of the models' activation functions, such as for example, sigmoid and softmax.

The disclosed SPINDLE system allows to train a machine learning model (e.g. a feed-forward neural network) in a privacy-friendly manner with a setting where secret (e.g. sensitive) data is distributed among multiple (untrusted) data providers, and where only one trusted data provider is required to make ML model training and subsequent prediction secure. Thereby, local ML models and prediction results stay secret while using a global model that has been trained with many distributed datasets to achieve a high prediction accuracy.

Some prior arts approaches in privacy-preserving distributed learning operate on the two-server model, where data owners encrypt or secret-share their data among two non-colluding servers that are responsible for the computations. SPINDLE differs from these approaches as it does not restrict to the two non-colluding server model, and focuses instead on N-party systems, with N>2.

Other distributed and privacy-preserving ML prior art approaches employ a three-server model and rely on secret-sharing techniques to train linear regressions, logistic regressions, and neural networks. However, such solutions are tailored to the three-party server model and assume an honest majority among the computing parties. SPINDLE enables better scalability in terms of the number of model's features, size of the dataset and number of data providers, and further offers richer functionalities by relying on the generic and widely-applicable SGD.

In contrast to the known prior art approaches, SPINDLE not only accounts for the private evaluation of machine-learning models but also for their privacy-preserving training in the distributed setting. The secrecy of local machine learning models and input data is therefore guaranteed. Also, the secrecy of the local training data can be guaranteed when the local training data is encrypted in the same manner as the local machine learning model.

Further aspects of the invention will be realized and attained by means of the elements and combinations particularly depicted in the appended claims. It is to be understood that both the foregoing general description and the following detailed description are exemplary and explanatory only, and are not restrictive of the invention as described.

BRIEF DESCRIPTION OF THE DRAWINGS

FIGS. 5A, 5B, 5C, 5D, 5E, 5F, 5G are pseudo-code examples of example protocols which are used by embodiments of the distributed computer system;

FIGS. 6A, 6B illustrate CKKS and distributed CKKS schemes as used by an embodiment of the distributed computer system;

FIG. 7 illustrates a system parameters graph according to an embodiment; and

FIG. 8A, 8B provide a list of definitions of symbols which are used in the following description.

DETAILED DESCRIPTION

In the following description, matrices are denoted by upper-case-bold characters, and vectors by lowercase-bold characters. The i-th row of a matrix X is depicted as $X[i,\cdot]$, and its i-th column as $X[\cdot,i]$. Similarly, the i-th element of a vector y is denoted by $y[i]$. A list of symbols which are used in the following description is given in FIGS. 8A and 8B.

Figure 1:
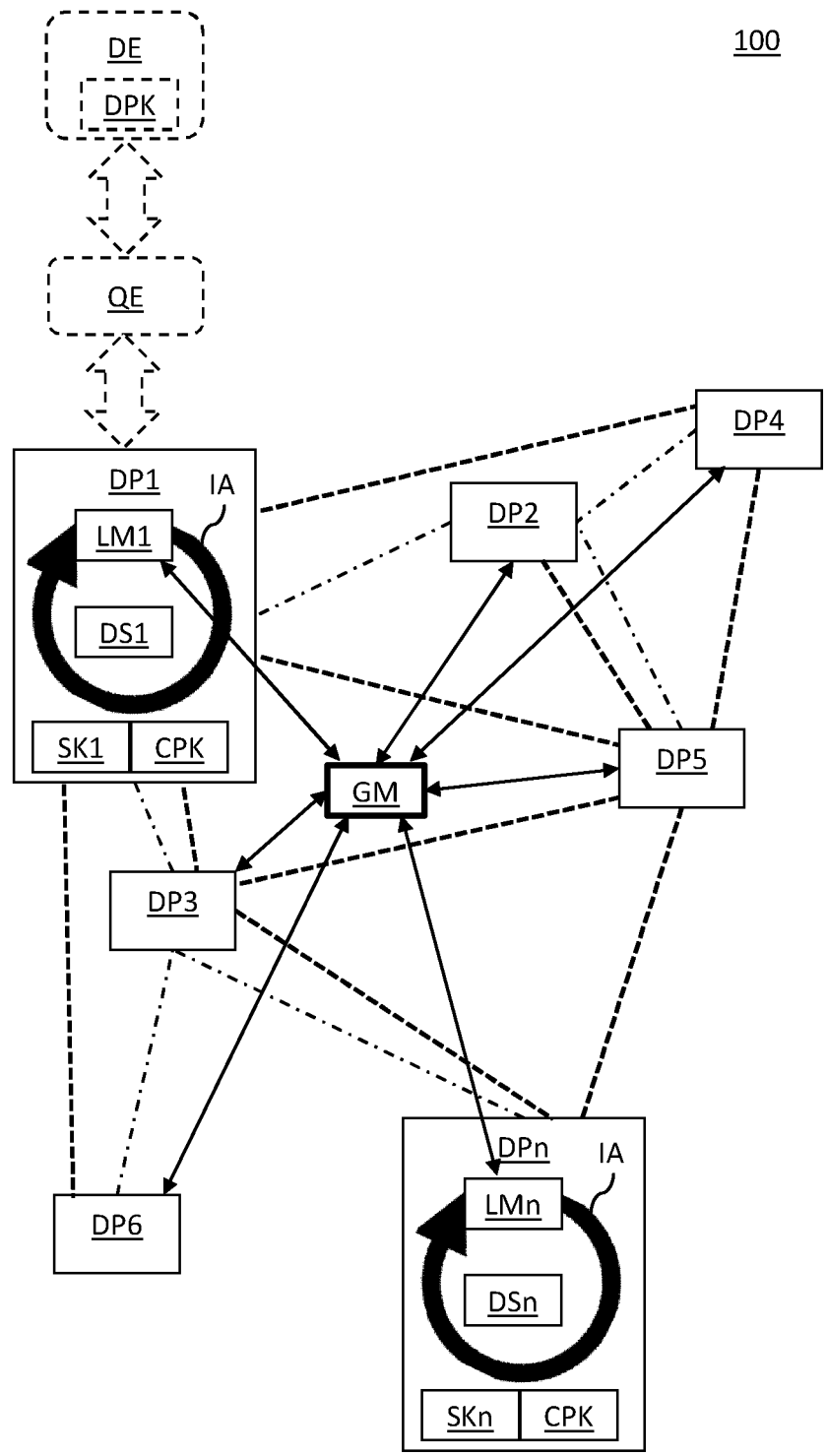
FIG. 1 illustrates a simplified diagram of a distributed computer system for privacy-preserving distributed training of a global machine learning model according to an embodiment.
Figure 2A:
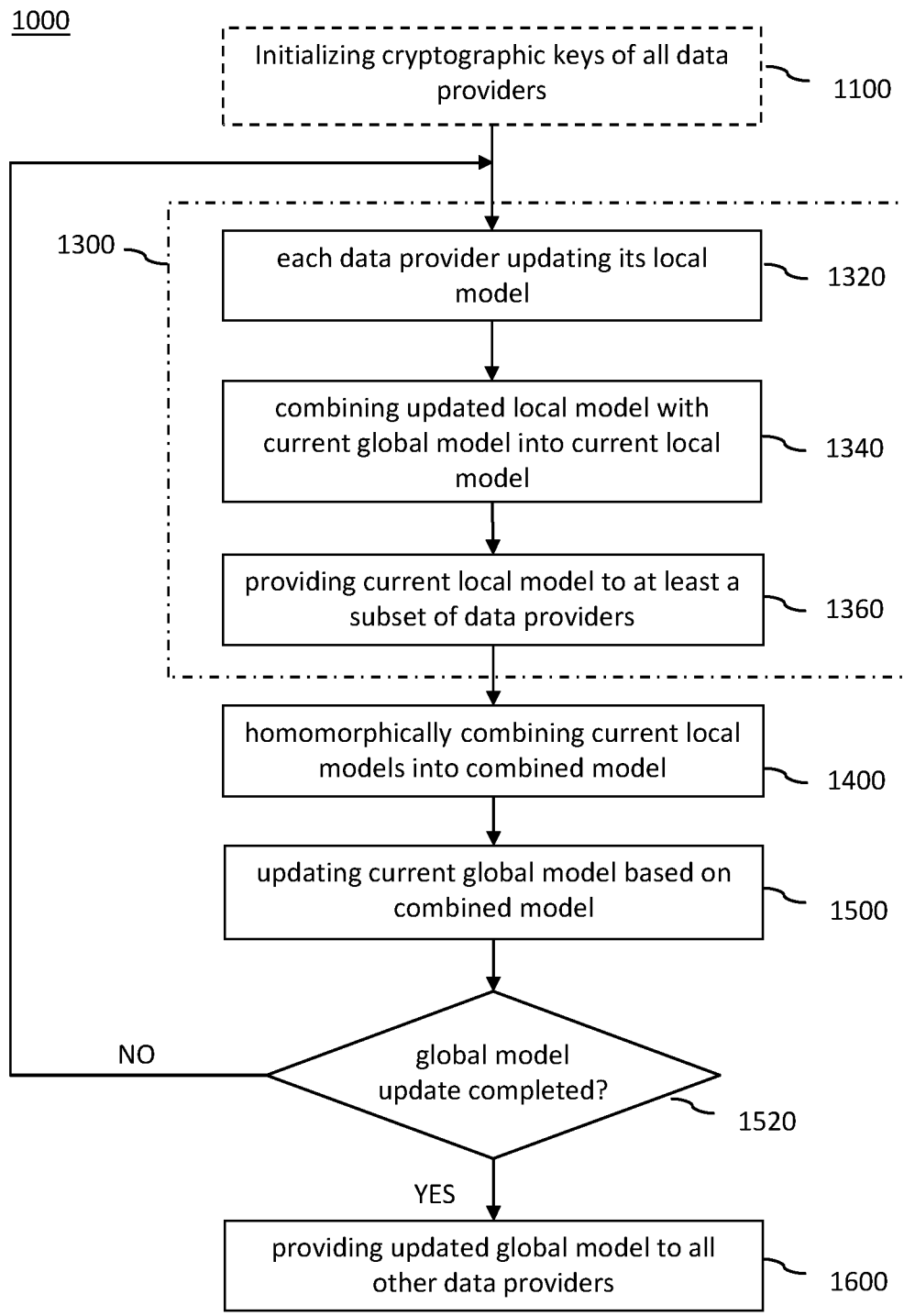
FIG. 2A is a simplified flow chart illustrating a computer-implemented method for privacy-preserving distributed training of a global machine learning model according to an embodiment.

FIG. 1 includes a simplified block diagram of a distributed computer system 100 for privacy-preserving distributed training of a global machine learning model (global model GM) on distributed datasets DS1 to DSn according to an example embodiment. FIG. 2A is a simplified flow chart illustrating a computer-implemented method 1000 for privacy-preserving distributed training of the global machine learning model according to an embodiment. The steps of the method 1000 are performed by respective components of the distributed computer system 100. Therefore, FIG. 1 is described in view of FIG. 2A and the following part of the description refers to reference numbers of both, FIG. 1 and FIG. 2A. It is to be noted that the reference numbers used in the figures may deviate from corresponding symbols used in formulas and protocols of the description and figures.

The plurality of data providers DP1 to DPn is communicatively coupled such that each data provider can exchange information with any other data provider. In the example, the dashed lines represent physical communication channels between pairs of data providers. In the example, not every data provider is coupled with every other data provider. For example, DP1 is coupled with DP5 but has no direct channel with DP2. However, DP1 can exchange information with DP2 via DP5. The dash-dotted lines represent a tree structure which can be formed when all data providers are connected with each other via respective communication channels for efficiently answering queries, which will be explained later. The double-arrows between the general model GM and each data provider symbolize that each data provider has a current copy of the general model, or can at least access the current general model GM at any time.

Each data provider has a respective local machine learning model (local models LM1 to LMn). In the example, only DP1 and DPn are shown with their internal structure. However, the remaining data providers DP2 to DP6 all have the corresponding internal structure. Further, each DP* ("*" being used as a placeholder for indices 1 to n) has a respective local training dataset DS* (DS1 to DSn) for training the respective local model LM1 to LMn using an iterative training algorithm IA. The local models LM1 to LMn and local training datasets DS1 to DSn of all data provider systems adhere to the same structure and data formats, and the same training parameters are used by all data providers for training their local models. The plurality of all local training datasets thereby represents a global training dataset for the global model GM.

Each data provider has a portion of a cryptographic distributed secret key SK1 to SKn and a corresponding collective cryptographic public key CPK of a multiparty fully homomorphic encryption scheme. The cryptographic keys SK1 to SKn, CPK are collectively initialized 1100 by the plurality of data providers DS1 to DSn. The initialization step 1100 is only performed once and is therefore executed before the actual training of the global model starts. The local model of each DP* as well as the global model are encrypted with the collective public key CPK.

Each data provider DP* is configured to train 1300 its local model LM* using the respective local training dataset DS* by executing a predefined number of local iterations of an iterative multidimensional optimization algorithm (e.g., gradient-descent-based updates) to its local model LM*. In this context, the local model training (dashed-dotted frame 1300) is perceived to be finished once the protected trained local model is provided 1360 for further processing to other data providers. However, the provisioning step 1360 does not change the trained local model anymore.

The global training dataset $(X_{n \times c}, y_n)$, with $X_{n \times c}$ a matrix of n records and c features, and $y_n$ a vector of n labels, may be distributed among the set (plurality) of data providers, i.e., $S = \{DP_1, \ldots, DP_{|S|}\}$. The global dataset is horizontally partitioned, i.e., each data provider $DP_i$ holds a partition of $n_i$ samples $(X^{(i)}, y^{(i)})$, with $\Sigma_{i=1}^{|S|} n_i = n$. A querying entity QE, which can also be a data provider, may requests the training of the global model on the distributed dataset $(X_{n \times c}, y_n)$, or the evaluation of an already trained model on its input $(X^{(i)}, \cdot)$.

It is assumed that the data providers are willing to contribute their respective data to train and to evaluate their local models on the distributed dataset. It is further assumed that the data providers are all communicatively coupled and organized in a topology that enables efficient execution of the computations. For instance, as depicted in FIG. 1, they can be organized in a tree structure that enables parallelization for query executions.

Although the data providers wish to collaborate for the execution of machine learning workflows, they do not necessarily trust each other. As a result, they seek to protect the secrecy of their data (used for training and evaluation) and of the collectively learned model. More formally, the following security properties must hold in an Anytrust model, where at least one data provider and the querying entity QE are honest-but-curious (or honest):

(a) Data Confidentiality: The training data of each data provider $DP_i$, i.e., $(X^{(i)}, y^{(i)})$ and the querier's evaluation data 160 $(X', \cdot)$ should remain only known to their respective owners. To this end, data confidentiality is satisfied as long as the involved parties (data providers and querying entity) do not obtain any information about other parties' inputs other than what can be deduced from the output of the process of training or evaluating a model.
(b) Model Confidentiality: During the training process, no data provider DP; should gain more information about the model that is being trained than what it can learn from its own input data, i.e., $(X^{(i)}, y^{(i)})$. During prediction, the querier should not learn anything more about the model than what it can infer from its input data $(X', \cdot)$ and the corresponding predictions y'. Whereas confidentiality has to be ensured in the Anytrust model, the correctness of the computations is guaranteed if all DPs are honest-but-curious.

Figure 4A:
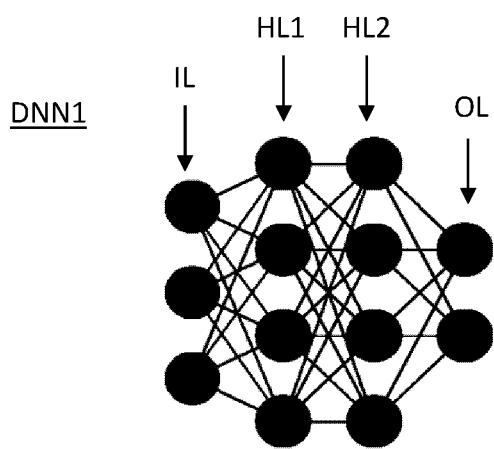
FIG. 4A illustrates a machine learning model implemented as a feed-forward neural network.
Figure 4B:
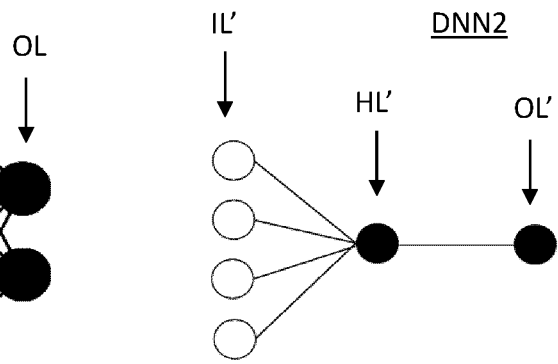
FIG. 4B illustrates a generalized linear model as a special case of a feed-forward neural network.

As mentioned before, the machine learning models LM*, GM are implemented by feed-forward neural networks with one or more hidden layers wherein the one or more hidden layers comprise only activation functions that can be approximated by a polynomial function. Two examples DNN1, DNN2 of such feed-forward neural networks are illustrated in FIGS. 4A, 4B. DNN1 in FIG. 4A is a more general deep neural network which has an input layer IL, two hidden layers HL1, HL2 and an output layer OL.

DNN2 in FIG. 4B is a special form a feed-forward neural network which has an input layer IL', an output layer OL', and in between only a single hidden layer HL' made of one node that defines an activation function according to a Generalized Linear Model, where the combination of a feature matrix X and a weights vector w (i.e. the linear predictor) is related to a vector of class labels y by the activation function a such that $E(y) = \sigma^{-1}(Xw)$, where $E(y)$ is the mean of y. The type of such GLM can be any of linear regression, logistic regression, and multinomial logistic regression.

In the following example embodiments the widely-used linear (i.e., $\sigma(Xw) = Xw$), logistic (i.e., $\sigma(Xw) = 1/(1+e^{-Xw})$) and multinomial (i.e., $\sigma(Xw_\cdot) = e^{Xw\lambda}/(P\Sigma_{j \in cl} e^{Xwj})$, for $\lambda \in cl$) regression models are used for explanation purposes without any intention to limit the scope of the claims. For multinomial regression, the weights are represented as a matrix $W_{c \times |d|}$, where c is the number of features, cl is the set of class labels and $|cl| =$ its cardinality. Unless otherwise stated, the operations are defined on a single vector of weights w and, in the case of multinomial regression, they are replicated on the $|cl|$ vectors of weights, i.e., each column of $W_{c \times |d|}$.

For the distributed training of the global model a cooperative gradient descent can be used which is a distributed version of the popular mini-batch stochastic gradient descent (SGD) can be used, as described for example, in the following papers:

A. Kumar, J. Naughton, and J. M. Patel. Learning generalized linear models over normalized data. In ACM International Conference on Management of Data (SIGMOD), 2015.

P. Toulis, E. Airoldi, and J. Rennie. Statistical analysis of stochastic gradient methods for generalized linear models. In International Conference on Machine Learning (ICML), 2014.

T. Zhang. Solving large scale linear prediction problems using stochastic gradient descent algorithms. In International Conference on Machine Learning (ICML), 2004

In the standard version of SGD, the goal is to minimize $\min_w [f(w) := (w; X[\phi, \cdot])]$, where $f(\cdot)$ is the loss function defined by the learning model, $w \in R_c$ are the model parameters, and $X[\phi,]$ is the $\phi$th data sample (row) of X. The local model is then updated by m local iterations $w^{(I)} = w^{(I-1)} - \alpha[g(w^{(I-1)}; B(I))]$, for $I = 1, \ldots, m$, with $\alpha$ the learning rate, $B(I)$ a randomly sampled sub-matrix of X of size $b \times c$, and $g(w,B) = B^T(\sigma(Bw) - I(z))$, where z is the vector of labels corresponding to the batch B and $I(\cdot)$ depends on the type of regression.

For linear and logistic regression, $I(\cdot)$ is the identity function. For multinomial, where $z[\phi] \in cl$, it is an indicator function which outputs a vector whose elements, with $\lambda \in cl$, are 1 when $y[\phi] = \lambda$ and 0 otherwise.

More precisely, the training may be based on the cooperative SGD (CSGD) as proposed by J. Wang and G. Joshi in "Cooperative SGD: A unified framework for the design and analysis of communication-efficient SGD algorithms. CoRR, abs/1808.07576, 2018" due to its properties. In particular:

(i) modularity, as it can be synchronous or asynchronous, and can be combined with classic gradient-descent convergence optimizations such as Nesterov accelerated SGD [Y. Nesterov. Smooth minimization of non-smooth functions. Mathematical programming, 103(1): 127-152, 2005];

(ii) applicability, as it accommodates any ML model that can be trained with SGD and enables the distribution of any SGD based solution;

(iii) it guarantees a bound on the error-convergence depending on the distributed parameters; e.g., the number of iterations and the update function for the global weights.

The data providers (DPs), each of which owns a part of the (global training) dataset, locally perform multiple iterations of the SGD before aggregating their model weights into the global model weights. The global weights are included in subsequent local DP computations to avoid that they learn, or descend, in the wrong direction.

Figure 3A:
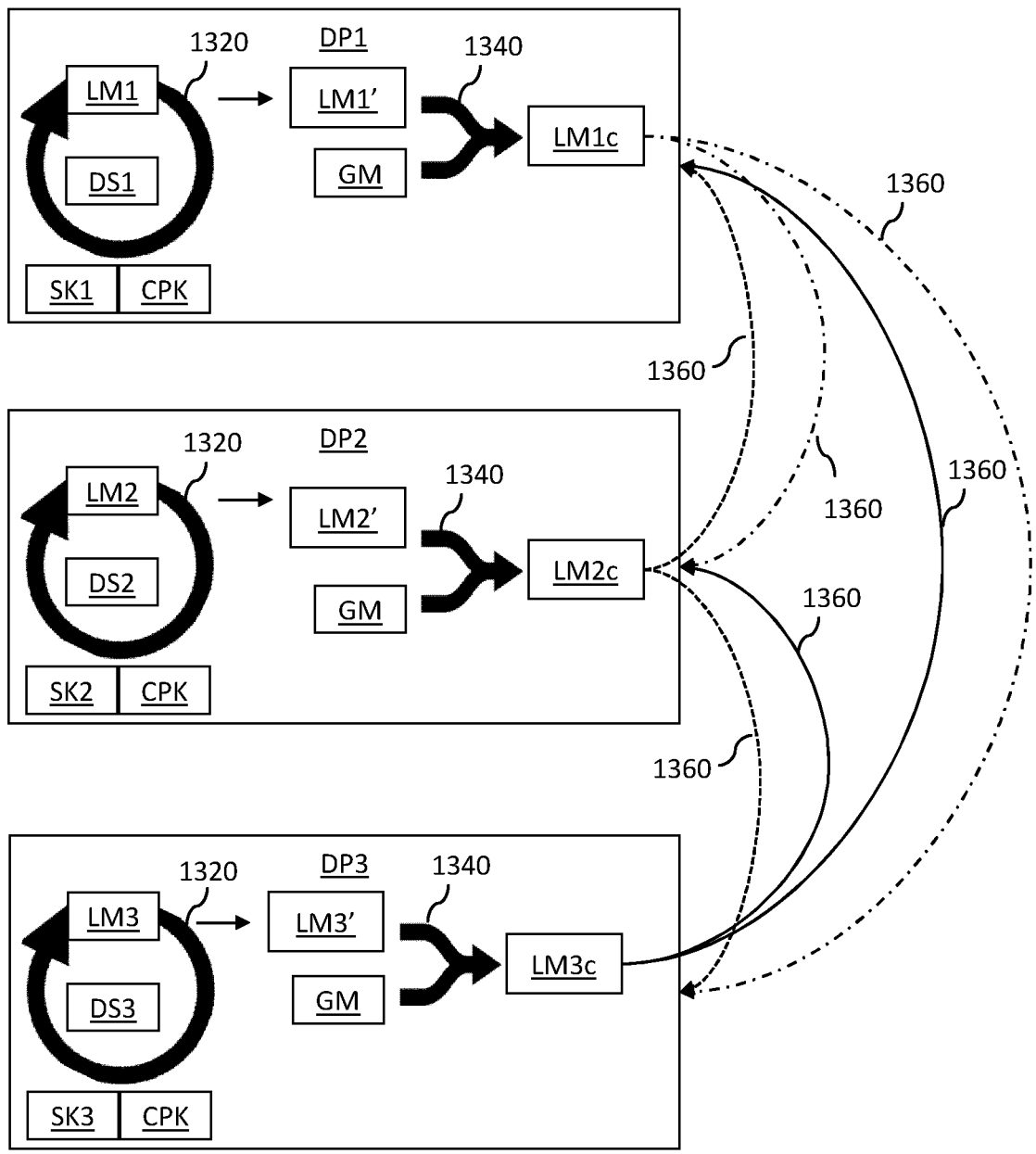
FIG. 3A illustrates training of local machine learning models according to an embodiment.

This step is illustrated in FIG. 3A. by way of example for the data providers DP1, DP2, DP3. Each data provider DP* combines 1340 its updated local model LM*' with the current global model GM into a current local model LM*c. The current local model LM*c is then provided 1360 to at least a subset of the data providers. In the example of FIG. 3A, each data provider provides 3160 its current local model to the other two data providers.

For simplicity, the disclosed SPINDLE approach is presented with the synchronous CSGD version, where the DPs perform local model updates simultaneously. Implementing the asynchronous version instead would imply accepting a subset of local models during the combine, following the same procedure and formulation of the synchronous one. In more detail, for each DPi, the local update rule at global iteration j and local iteration I is:

$$w^{(i,j,I)} = w^{(i,j,I-1)} - \alpha \zeta(w^{(i,j,I-1)}; B^{(I)}) - \alpha \rho(w^{(i,j,I-1)} - w_G^{(\cdot,j-1)}), \quad \text{(equation 1)}$$

where $w_G^{(\cdot,j-1)}$ are the global weights from the last global update iteration j−1, α is the learning rate and ρ, the elastic rate, is the parameter that controls how much the data providers can diverge from the global model. The set of DPs S perform m local iterations between each update of the global model that is updated at global iteration j with a moving average by:

$$w_G^{(\cdot,j)} = (1 - |S|\alpha\rho) w_G^{(\cdot,j-1)} - \alpha\rho \Sigma_{i=0}^{|S|} w^{(i,j,m)}, \quad \text{(equation 2)}$$

In the asynchronous version of CSGD, the index i would traverse only the elements of the subset of S that participate in the combine step. It must be noted that the sum in (equation 2) can be a weighted sum if the data providers are not contributing equally to the combination (i.e., both in terms of different frequency of participation in the combine-update steps, and difference in the size of the respective local datasets).

Figure 3B:
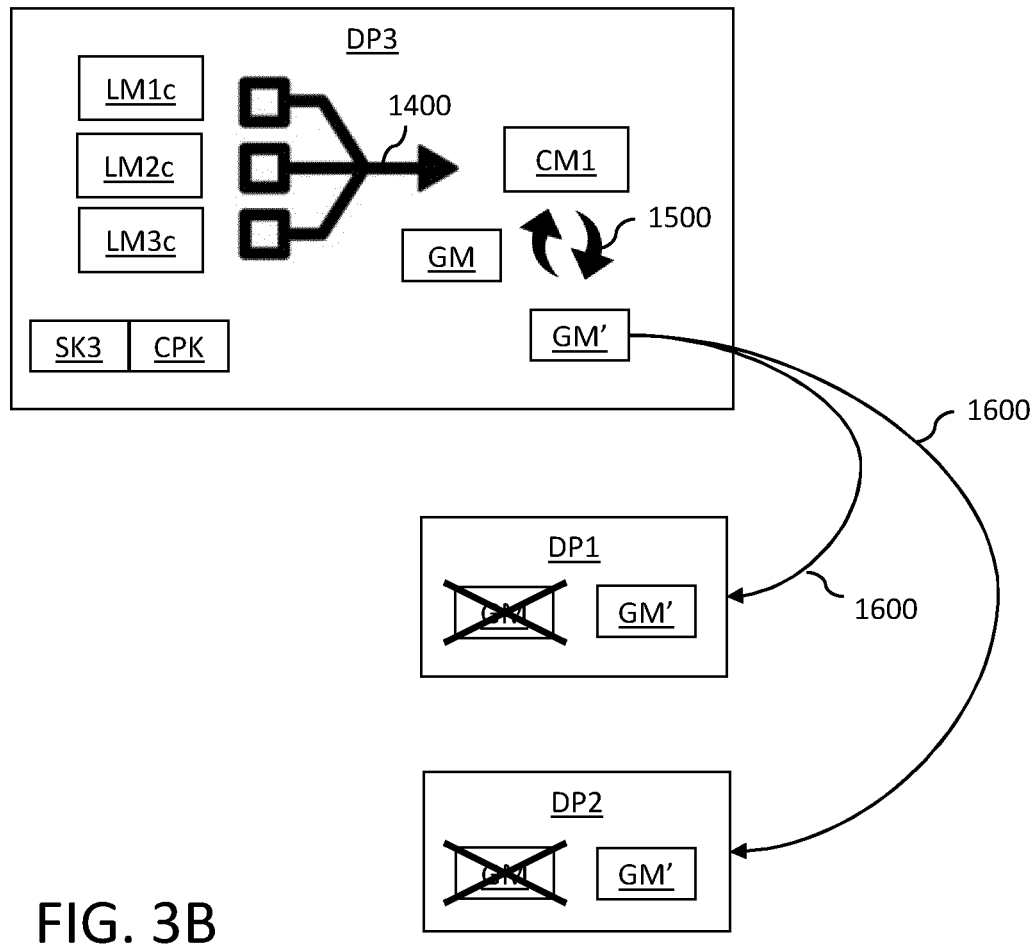
FIG. 3B illustrates homomorphic combination of local models and updating of the global model according to an embodiment.

FIG. 3B illustrates homomorphic combination 1400 of the current local models LM*c by DP3 into a combined model CM1. That is, the protection mechanism used by SPINDLE relies on a distributed (or multiparty) fully-homomorphic encryption scheme [cf. C. Mouchet, J. R. Troncoso-Pastoriza, and J. P. Hubaux. Multiparty homomorphic encryption: From theory to practice. In Technical Report 816 https://eprint.iacr.org/2020/304, 2019] in which the secret key is distributed among the parties while the corresponding collective public key pk is known to all of them. Thus, each party can independently compute on ciphertexts encrypted under pk but all parties have to collaborate to decrypt a ciphertext. In SPINDLE, this enables the data providers to train the collectively encrypted global model, that cannot be decrypted as long as at least one data provider is honest and refuses to participate in the decryption. This multiparty scheme also enables data providers to collectively switch the encryption key of a ciphertext from pk to another public key without decrypting. A collectively encrypted prediction result can thus be switched to a public key of a destination entity, so that only the destination entity can decrypt the result.

Mouchet et al. propose a multiparty version of the Brakerski Fan-Vercauteren (BFV) lattice-based homomorphic cryptosystem and introduce interactive protocols for key generation, decryption, and bootstrapping. In one embodiment, SPINDLE uses an adaptation of this multiparty scheme to the Cheon-Kim-Kim-Song cryptosystem (CKKS) [cf. J. H. Cheon, A. Kim, M. Kim, and Y. Song. Homomorphic encryption for arithmetic of approximate numbers. In Springer International Conference on the Theory and Application of Cryptology and Information Security (ASIACRYPT), 2017] that enables approximate arithmetic, and whose security is based on the ring learning with errors (RLWE) problem [cf. V. Lyubashevsky, C. Peikert, and O. Regev. On ideal lattices and learning with errors over rings. In Springer Annual International Conference on the Theory and Applications of Cryptographic Techniques (EUROCRYPT), 2010.]. In the following, the main parameters of the CKKS cryptographic scheme and the multiparty cryptographic operations are described as used in one embodiment of SPINDLE. The cited work of Cheon et al. describes the details of the CKKS cryptoscheme and the work of Mouchet et al. provides the complete definition and security of the distributed protocols.

The CKKS cryptoscheme is illustrated in FIG. 6A. CKKS enables arithmetic over $C^{N/2}$; the plaintext and ciphertext spaces share the same domain $R_Q = Z_{Q(X)}/(X^N+1)$, with N a power of 2. Both plaintexts and ciphertexts are represented by polynomials of N coefficients (degree N−1) in this domain. A plaintext/ciphertext encodes a vector of up to N/2 values.

The CKKS parameters are denoted by the tuple (N,Δ,η, mc), where N is the ring dimension, Δ is the plaintext 247 scale, or precision, by which any value is multiplied before being encrypted/encoded, η is the standard deviation of the noise distribution, and mc represents a chain of moduli $\{q_0, \ldots, q_L\}$ such that $\Pi \iota \in_{\{0, \ldots, \tau\}} q_\iota = Q\tau$ is the ciphertext modulus at level τ, with $Q_L = Q$, the modulus of fresh ciphertexts. Operations on a level-τ ciphertext (v) are performed modulo $Q_\tau$, with Δ always lower than the current $q_\tau$. Ciphertexts at level τ are simply vectors of polynomials in $R_{Q\tau}$, that we represent as (v) when there is no ambiguity about their level, and use $\{\langle v \rangle, \tau, \Delta\}$ otherwise. After performing operations that increase the noise and the plaintext scale, $\{\langle v \rangle, \tau, \Delta\}$ has to be rescaled (see the ReScale(·) procedure defined below) and the next operations are performed modulo $Q_{\tau-1}$. Before reaching level 0, ⟨v⟩ has to be bootstrapped. The security of the cryptosystem depends on the choice of N, Q and η, which in this work are parameterized to achieve at least 128-bits of security.

The operations of CKKS which are used by this embodiment are described in scheme 601 of FIG. 6A. v is a vector of cleartext values, sk and pk are the secret and public keys, and evk is an evaluation key. When two ciphertexts are multiplied together, the result has to be relinearized Relin(·) to avoid that the ciphertext size grows. After multiple Rescale(·) operations, ⟨v⟩ has to be refreshed by a Bootstrap(·), which returns a ciphertext of level τ<L. The dot product DM(·) of two encrypted vectors of size a can be executed by combining a multiplication with log 2(a) inner-left rotations and additions.

In scheme 602 of FIG. 6B, three protocols are defined using the distributed version of CKKS. These protocols require the participation of all DPs, i.e., each DPi contributes its respective secret key ski. DKeyGen(·) generates the collective public key pk and evaluation keys evks by combining the protocols defined by Mouchet et al. These keys can then be used independently (without interaction) by a DP on a ciphertext ⟨v⟩$_{pk}$. The distribution of the scheme enables an efficient distributed bootstrapping DBootstrap(⟨v⟩,τ,Δ,{ski}) to collective refresh ⟨v⟩ to its initial level L. A distributed decryptionoperation DDec(·) is a special case of the DKeySwitch(·) where there is no pk', i.e., pk' is O.

Turning back to FIG. 3B, at least one data provider of the subset of data providers which performed the homomorphic combination—in the data provider example DP3—now updates 1500 the current global model GM based on the combined model CM1. As can be seen in FIG. 2, the update 1500 is repeated until the predefined number of maximum global iterations is reached. The global iterations loop can also stop earlier if a sufficient training level of the global model is already reached with less global iterations. For example, a further protocol agreed amongst the data providers may allow the data providers to obtain respective information about the current state of the global model. In case that such further protocol for executing a test on the current training level of the global model is not available, the predefined maximum number of global iterations may also be implemented as a pre-defined fixed number of global iterations without a stop condition. This stop condition is checked 1520 by the at least one data provider DP3. Only if the global model update has been completed, the updated global model GM' is provided 1600 to at least a subset of the other data providers (DP1 and D2 in FIG. 3B) of the plurality of data providers.

To summarize the proposed solution to the problem of privacy-preserving distributed learning for a global machine learning model, the MapReduce abstraction is used to capture the parallel and repetitive nature of distributed learning tasks. The workflow of the used extended MapReduce abstraction includes the following four phases: the data providers pre-process their data (PREPARE) before they iteratively train the model locally on their data (MAP). Subsequently, they combine their local models (COMBINE) and update the global model (REDUCE). The four phases in one embodiment of the extended MapReduce abstraction are illustrated in protocol 1 of FIG. 5A.

The PREPARE phase includes lines 1 to 3 of protocol 1. The data providers (DPs) collectively agree on the training parameters: the maximum number of global g and local m iterations, and the learning parameters Ip={α,ρ,b}, where α is the learning rate, ρ the elastic rate, and b the batch size. The DPs also collectively initialize the cryptographic keys for the distributed CKKS scheme by executing DKeyGen(·). Then, they collectively standardize, or normalize, the distributed dataset by obliviously computing the required statistics. The interactive protocols, i.e., Collective Aggregation and Collective Differential Privacy (CDP), and encodings by Froelicher et al. can be adapted to SPINDLE. These encodings define how the operations are locally executed by the DPs on their part of the dataset, so that the encrypted results can be collectively aggregated, obfuscated and combined to obtain the approximate statistics as if it was computed on the whole dataset. For instance, to standardize the dataset, each DP, for each feature, locally computes the sum of its value, the sum of its squared values, and the number of samples. These values are encrypted and then aggregated among all DPs. Then, the DPs collectively and obliviously add randomly sampled noise from a deviation. This differentially private mechanism ensures that the computed statistics leak limited information about the DPs' inputs even in the Anytrust model. The result is then shared with all DPs that locally standardize their dataset. Finally, the DPs initialize their local weights and pre-compute operations that involve only their input data $(\alpha X^{(i)}|(y^{(i)}))$ and $\alpha X^{(i)T})$.

MAP, COMBINE, and REDUCE are repeated g times. During iteration j, in MAP, each $DP_i$ updates its protected local model 184 $P(W^{(i,j)})$ using its input data $(X^{(i)}, y^{(i)})$, the global model of the previous iteration $P(W_G^{(\cdot,j-1)})$, and its previous local model $P(W^{(i,j-1)})$; then, it outputs its updated protected local model $P(W^{(i,j)})$. In COMBINE, the contributions $P(W^{(i,j)})$ of each $DP_i$, are securely combined with an application-dependent function $C^{(\cdot)}$. In REDUCE, $DP_R$ updates the global model $P(W_G^{(\cdot,j)})$ that is then broadcast to all DPs.

In more detail, the MAP phase relates to line 5 within the global iteration loop (line 4) of protocol 1. Details of the MAP phase are depicted in protocol 2 of FIG. 5B. The DPs execute m local iterations of the cooperative gradient-descent local update. The local weights of $DP_i$ (i.e., ⟨$w^{(i,j,l=1)}$⟩) are updated at a global iteration j and a local iteration l by computing the gradient (cf. Protocol 2, lines 4, 5, and 6) that is then combined with the current global weights ⟨$w_G^{(\cdot,j-1)}$⟩ (Protocol 2, line 7) following equation 1 from above. These computations are performed on batches of b samples and c features. The encrypted results of homomorphic computations performed locally can be re-randomized by the corresponding DP before sending them to other DPs, in case they would leak some of the secret DP inputs if released with no further changes. In protocol 2, line 5 the activation function σ(·) is computed on the encrypted vector ⟨u⟩ (or a matrix) ⟨U⟩ (in the case of multinomial). The activation function is exponential for logistic and multinomial regression. As the homomorphic properties of CKKS only enable the evaluation of polynomial functions, these activation functions are approximated with least-squares and Chebyshev polynomial approximations (PA) on chosen intervals. These intervals can be determined by computing the minimum and maximum input values over all DPs and features, or by relying on heuristics based on the data distribution. In the latter case, there might be values that fall out of the determined intervals; hence, a normalization algorithm can be applied in the encrypted domain to bring these out-of-bounds values inside the intervals, so that the approximation of the activation still holds.

The sigmoid function is approximated (apSigmoid(·)) by one least-square polynomial over a chosen interval, whereas softmax is computed by the multiplication of two Chebyshev approximations, one for the nominator $e^x$(apSoftN(·)) and one for the denominator $$\frac{1}{\sum e^{x_j}}$$

(apSoftD(·)), each computed on different intervals.

Protocol 3 in FIG. 5C illustrates the activation function a and takes as input an encrypted vector/matrix ⟨u⟩ or ⟨U⟩ and the type of the regression t (i.e., linear, logistic or multinomial). If t is linear, the protocol simply returns ⟨u⟩. Otherwise, if t is logistic, it computes the activated vector ⟨$\sigma^{(u)}$⟩ by using the polynomial approximation of the sigmoid, and if t is multinomial, it computes the activated matrix ⟨σ(U)⟩ using the softmax approximation. The polynomial approximation computation is detailed in Protocol 6 illustrated in FIG. 5F. To avoid an explosion of the exponential values in the softmax, a vector ⟨m⟩ that contains the approximated max (apMax(·)) value of each column of ⟨U⟩ is subtracted from all input values, i.e., from each ⟨U[λ,:]⟩ with =0, . . . , |c|. Similar to softmax, the approximation of the max function requires two polynomial approximations, and is detailed in protocol 7 of FIG. 5G. Protocol 7 can be used to compute the approximation of the maximum function. This protocol is used in the softmax approximation in order to avoid that the exponential values explode. It takes an encrypted matrix ⟨$U_{|c|\times c}$⟩, the approximations intervals $[a_i, g_i]$ and degrees d' and computes a vector ⟨m⟩ which contains a close approximation of the max of each column of ⟨U⟩.

The COMBINE phase relates to lines 6 and 7 of protocol 1. In this embodiment, the outputs of MAP, i.e., ⟨$w^{(i,j)}$⟩ of each DPi, are homomorphically combined ascending a tree structure, such that each DPi aggregates its encrypted updated local weights with those of its children and sends the result to its parent. In this case, the combination function C(·) is the homomorphic addition operation. At the end of this phase, the DP at the root of the tree $DP_R$ obtains the encrypted combined weights ⟨$w^{(\cdot,j)}$⟩. This embodiment is illustrated in FIG. 1 with the dashed-dotted lines defining the tree structure. In the example of FIG. 1, DP1 is the root data provider which has the children DP2 and DP3. DP2 is the parent node of DP4 and DP5. DP3 is the parent node of DP6 and DPn.

The REDUCE phase relates to line 8 of protocol 1. Details of one embodiment of REDUCE are shown in protocol 4 of FIG. 5D. The root data provider $DP_R$ updates the encrypted global weights ($w_G^{(\cdot,j)}$), as shown in Protocol 4. More precisely, it computes equation 2 from above by using the encrypted sum of the DPs' updated local weights ⟨$w^{(\cdot,j)}$⟩ (obtained from COMBINE), the previous global weights ⟨$W_G^{(\cdot,j-1)}$⟩, the pre-defined elastic rate ρ and the learning rate α.

After g global iterations of the MAP, COMBINE, and REDUCE, $DP_R$ obtains the encrypted global model ⟨$W_G^{(\cdot,g)}$⟩ and provides it to the rest of the data providers in the plurality of data providers.

To capture the complete ML workflow, we extend the MapReduce architecture with a PREDICTION phase. We also complement this abstraction with a protection mechanism P(·) such that P(x) denotes that value x has to be protected to satisfy the security properties of data and model confidentiality.

Figure 2B:
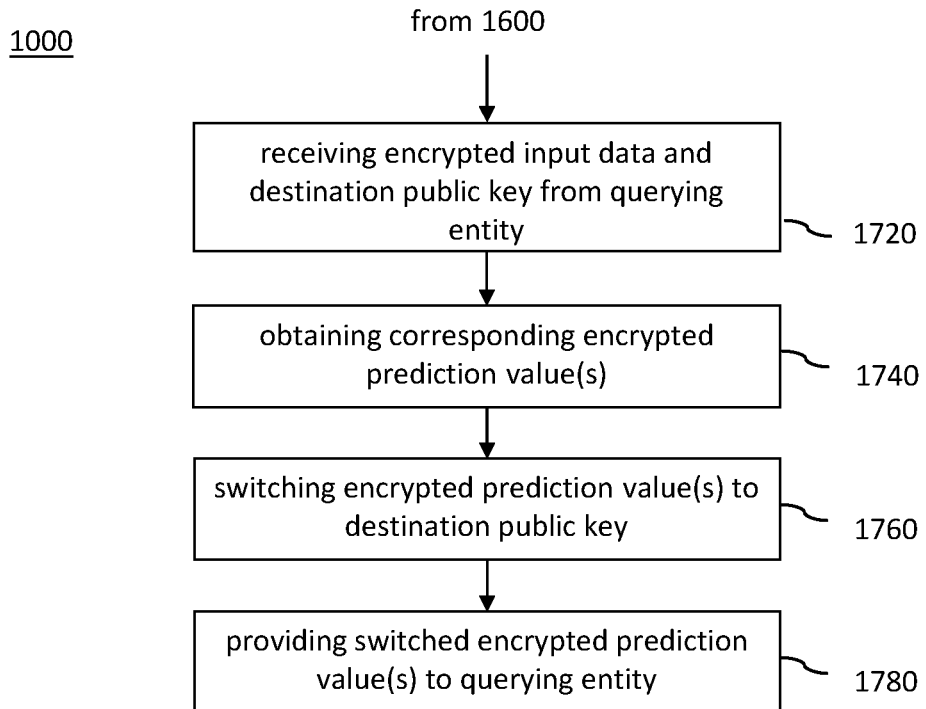
FIGS. 2B, 2C illustrate two alternative methods for enabling prediction based on the trained global machine learning model according to an embodiment.
Figure 2C:
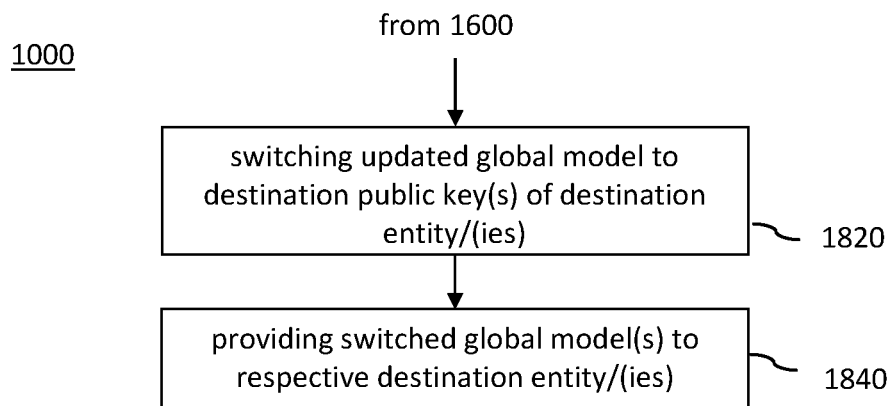

FIGS. 2B and 2C illustrated two alternative embodiments which allow predictions based on the trained global model such that secrecy of the input data can be guaranteed.

In the embodiment of FIG. 2B, the protected (encrypted) global model P($W_G^{(\cdot,g)}$) is used by one data provider DP1 to perform predictions (P(y')) in response to a query received 1720 from a querying entity QE (cf. FIG. 1). The query including encrypted input data P(X) (encrypted with the collective public key CPK), and further includes a destination public key DPK of a destination entity DE (cf. FIG. 1). The destination entity is the recipient of the prediction result to be provided in response to the input data. The destination entity DE can be different from the query entity QE (or they may be identical). The querying entity can be any of the data providers or it can be an entity which is not forming part of the plurality of data providers.

In response to the input data, the receiving data provider DP1 obtains 1740 one or more corresponding encrypted prediction values by applying the encrypted global model to the encrypted input data. Finally, the data provider DP1 switches 1760 the one or more encrypted prediction values to the destination public key, and provides 1780 the switched one or more encrypted prediction values to the querying entity QE so that only the destination entity DE can decrypt the one or more encrypted prediction values.

Protocol 5 of FIG. 5E illustrates details of one prediction embodiment. The input data (X',·) of the querying entity is encrypted with the collective public key pk. Then, ⟨X'⟩$_{pk}$ is multiplied with the weights of the trained model ⟨$W_G^{(\cdot,g)}$⟩ and processed through the activation function σ(·) to obtain the encrypted prediction values ⟨y'⟩ (one prediction per row of X). The prediction results encrypted under pk are then switched to the destination public key pk' using DKeySwitch(·), so that only the destination entity can decrypt ⟨y'⟩$_{pk'}$.

In more general words, the protected model P($W_G^{(\cdot,g)}$) is used by one DP to perform predictions (P(y')) on the querier's protected evaluation data P(X') and the querying entity cannot learn anything more about the model apart from what it can infer from its input data (X',·) and the corresponding predictions y'.

FIG. 2C illustrates an alternative embodiment for enabling predictions through a destination entity DE. In this embodiment, a particular data provider who is in possession of the current encrypted global model, and who knows one or more destination public keys of one or more destination entities, can switch 1820 the entire current (updated) global model to the one or more destination public keys. The resulting one or more switched global models are then provided 1840 to the respective destination entities for obtaining the corresponding decrypted global model. Once a destination entity is in possession of the clear text global model, it can perform predictions on that model with clear text input data without any risk of being eavesdropped because the predictions can be run within the secure environment of the destination entity. Thereby, it makes no differences whether the switched global model is provided directly to the destination entity or via a querying entity as an intermediate because the destination entity is finally running the prediction within its own secure environment.

In the following, the description closes with some general remarks on operations and optimizations of the SPINDLE system. It first describes how to optimize previously disclosed protocols by choosing when to execute cryptographic operations such as rescaling and (distributed) bootstrapping. Then, it discusses how to efficiently perform the MAP protocol which involves a sequence of matrix-multiplications and the evaluation of the activation function, in the encrypted domain.

Cryptographic Operations:

For ciphertexts {⟨v'⟩,τ,Δ} with the same scale Δ and level τ, the latter remains constant after homomorphic addition, whereas a product multiplies the scales. In the ciphertext space, all operations at level τ are executed modulo $Q_\tau$ and a ciphertext has to be rescaled when Δ grows too much. During Rescale(·), a ciphertext is divided by $q_\tau$, and subsequent operations are executed at level τ−1. When all levels are consumed, the ciphertext has to be bootstrapped. If two ciphertexts are multiplied, the resulting ciphertext grows in the number of polynomial components, and it has to be relinearized (Relin(·)). In summary, any multiplication involving ciphertext(s) incurs the execution of other cryptographic operations and hence increases SPINDLE's computation overhead. This overhead can rapidly grow when the same ciphertext is involved in sequential operations, i.e., when the operations' multiplicative depth is high. In one embodiment of SPINDLE, the system relies on the Lattigo lattice-based cryptographic library [cf. Lattigo: A library for lattice-based homomorphic encryption in go. https://github.com/ldsec/lattigo (14.02.2019)] where a ciphertext addition or multiplication requires a few ms, while Rescale(·), Relin (·), and DBootstrap(·), are 1-order, 2-orders, and 1.5-orders of magnitude slower than the addition, respectively. These operations can be computationally heavy, and their execution in the protocols should be optimized.

The use of the centralized traditional bootstrapping is avoided, as it would require a much more conservative parameterization for the same security level, resulting in even higher computational overheads.

Lazy Rescaling

To maintain the precision of the encrypted values and for efficiency, a ciphertext is only rescaled when $\Delta$ is close to $q_r$. Hence, a rescaling operation (ReScale(·)) is only performed if this condition is met, after a series of consecutive operations.

Relinearization

Letting the ciphertext grow after every multiplication can add to the subsequent operations an overhead that is higher than the relinearization. To maintain the ciphertext size and degree constant, a Relin(·) operation is performed after each ciphertext-ciphertext multiplication. This Relin(·) operation can be deferred if doing so incurs in a lower computational complexity (e.g., if additions performed after the ciphertext-ciphertext multiplications reduce the number of ciphertexts to relinearize).

Bootstrapping

In the protocols of FIGS. 5A to 5E, the data providers local weights and the model global weights (⟨w⟩ and ⟨$w_G$⟩, resp.) are the only persistent ciphertexts over multiple computations and iterations. They are therefore the only ciphertexts that need to be bootstrapped and two approaches are considered for this.

With (a) Local bootstrap (LB), each data provider (DP) bootstraps (calling a DBootstrap(·) protocol) its local weights every time they reach their last level during the MAP local iterations and before the COMBINE. As a result, the global weights are always combined with fresh encryptions of the local weights and only need to be bootstrapped after multiple REDUCE. Indeed, REDUCE involves a multiplication by a constant and therefore a Rescale(·).

With (b) Global bootstrap (GB), the interdependency between the local and global weights is leveraged, and we bootstrap only the global weights and assign them directly to the local weights. The bootstrapping is performed on the global weights during REDUCE. Thus, the training is modified so that MAP operates on the (bootstrapped) global weights, i.e., $w^{(i,j-1)} = w_G^{(\cdot, j-1)}$, for a $DP_i$ at global iteration j. Following this approach, the number of bootstrap operations is reduced, with respect to the local approach, because it is performed only by one DP and only depends on the number of global iterations. However, it modifies the learning method, and it offers less flexibility, as the number of local iterations in MAP is constrained by the number of ciphertext multiplications required in each iteration and by the available ciphertext levels.

In experiments it was observed that the effect on the trained model's accuracy depends mainly on the data and that in most cases, enabling DPs to perform more local iterations (LB) between two global updates yields a better accuracy. Even though LB incurs at least |S| more executions of the DBootstrap(·), the DPs execute them in parallel and thus amortize the overhead on SPINDLE's execution time. However, if the training of a dataset requires frequent global updates, then GB may be preferred.

Taking into account these cryptographic transformations and the strategy to optimize their use in SPINDLE, it is now explained how to optimize the required number of ciphertext operations.

MAP Matrix-Multiplications

As described earlier, each CKKS ciphertext encrypts (or packs) a vector of values, e.g., 8,192 elements if the ring dimension is $N=2^{14}$. This packing enables simultaneously performing operations on all the vector values, by using a Single Instruction Multiple Data (SIMD) approach for parallelization. To execute computations among values stored in 364 different slots of the same ciphertext, e.g., an inner sum, SPINDLE can rely on ciphertext rotations, which have a computation cost similar to a relinearization (Relin(·)).

For the execution of stochastic gradient descent, each local iteration in MAP involves two sequential matrix-multiplications on encrypted data (Protocol 2, lines 4 and 5). As such, packing is useful to reduce the number of vector multiplications and rotations needed to perform these vector-matrix-multiplications. To this end, two packing approaches can be integrated which can be chosen depending on the setting.

Row-Based Approach (RBA): This approach was proposed by Kim et al. [cf., A. Kim, Y. Song, M. Kim, K. Lee, and J. H. Cheon. Logistic regression model training based on the approximate homomorphic encryption. BMC 786 medical genomics, 2018].

Diagonal Approach (DA). This approach was presented by Halevi and Shoup [cf., S. Halevi and V. Shoup. Algorithms in helib. In Annual International Cryptology Conference (CRYPTO). Springer, 2014] as an optimized homomorphic matrix-multiplication evaluation.

Optimized Activation Function

To enable execution of the activation functions under FHE, the sigmoid (apSigmoid(·)) and softmax 402 (apMax (·), apSoftN(·), and apSoftD(·)) activation functions are approximated with polynomial approximations (PA). Their evaluation requires multiple ciphertext-ciphertext multiplications and must be optimized to minimize the number of products and the used levels. To this end, the optimized baby-step giant-step algorithm introduced by Han and Ki [cf., K. Han and D. Ki. Better bootstrapping for approximate homomorphic encryption. Cryptology ePrint Archive, Report 2019/688, 2019. https://eprint.iacr.org/2019/688] is adapted, that enables the minimum-complexity computation of a degree-d approximation with a multiplicative depth of $\log(d)$ for $d \leq 7$, and with depth $\log(d)+1$ otherwise (Protocol 6).

The coefficients of the PA are generated using the definition of the function to be approximated, the interval and the degree. Then, the approximation function AF(·) takes the encrypted vector ⟨u⟩, the degree d and the coefficients r of the PA, and outputs ⟨α⟩, the encrypted PA evaluation of ⟨u⟩. Protocol 6 inductively computes the (element-wise) exponentiation of the encrypted input vector ⟨u⟩: ⟨$u^2$⟩, ⟨$u^4$⟩, ⟨$u^8$⟩, ..., ⟨$u^{2^{(\omega-1)}}$⟩ (Protocol 6, line 2), where ω is the smallest value satisfying $2^\omega > d$. Then, it recursively evaluates P(⟨u⟩)=$\Sigma i=_{1,3,5,\ldots,d}$ $r_i$⟨$u^i$⟩ = ⟨$u^{2^{(\omega-1)}}$⟩ q(⟨u⟩)+R(⟨u⟩) (Protocol 6, line 3). Note that p(·), q(·), and R(·) are functions of ⟨u⟩ and of the approximation coefficients r, q(·) is the quotient of the division of the actual activation function p(·) by ⟨$u^{2^{(\omega-1)}}$⟩, and R(·) is the remainder of the division. d(x) is a function that outputs the degree of x. For a degree-5 approximation, we have $\langle p(u)\rangle = \langle u^4\rangle q(\langle u\rangle)+R(\langle u\rangle)$, where $q(\langle u\rangle)=r[5]\langle u\rangle$ and $R(\langle u\rangle)=r[0]+r[1]\langle u\rangle+r[3]\langle u^3\rangle$. The algorithm is then recursively executed on $q(\langle u\rangle)$ and $R(\langle u\rangle)$ (Protocol 6, line 6).

FIG. 7 illustrates a System Parameters Graph 700 where circles and dotted circles represent learning and cryptographic parameters, respectively. In the following it is discussed how to parameterize SPINDLE by taking into account the interdependencies between the input data, and the learning and cryptographic parameters. It also described how the system operations are affected when at least some of the data providers are not the data owners, i.e., they do not have access to plaintext data. Finally, it explained how the trained model can be released if it is not kept secret to be used for privacy-preserving prediction.

Parameter Selection.

The SPINDLE system relies on the configuration of (a) cryptographic parameters, that determine its security level, (b) learning parameters, that affect the accuracy of the training and evaluation of the models. Both are tightly linked, and these relations are illustrated in the graph-based model of FIG. 7, where vertices and edges represent the parameters and their interdependence, respectively. For simplicity, a directed graph is presented that depicts an empirical method for choosing the parameters. It is to be noted that the corresponding non-directed graph is more generic and simply captures the main relations among the parameters.

Two main clusters can be observed: the cryptographic parameters on the upper part of the graph (dotted circles), and the learning parameters (circles) on the lower part. The input data and their intrinsic characteristics, i.e., the number of features c or precision (bits of precision required to represent the data), are connected with both clusters, which are also interconnected through the plaintext scale $\Delta$. As such, there are various ways to configure the overall system parameters.

In one embodiment, one may first choose N (ciphertext polynomial degree), such that at least c elements can be packed in one ciphertext. Q (ciphertext modulus) and q (fresh encryption noise) are then fixed to ensure a sufficient level of security (e.g., 128-bits) following the accepted parameterization from the homomorphic encryption standard whitepaper [cf. M. Albrecht, M. Chase, H. Chen, J. Ding, S. Goldwasser, S. Gorbunov, S. Halevi, J. Hoffstein, K. Laine, K. Lauter, S. Lokam, D. Micciancio, D. Moody, T. Morrison, A. Sahai, and V. Vaikuntanathan. Homomorphic encryption security standard. Technical report, HomomorphicEncryption.org, November 2018]. The scale $\Delta$ is configured to provide enough precision for the input data X, and mc (moduli chain) and L (number of levels) are set accordingly. The intervals $[a_i, g_i]$ used for the approximations of the activation functions are defined according to X.

The approximation degrees d are then set depending on these intervals and the available number of levels L. The remaining learning parameters ($\alpha$, $\rho$, b, g, m) are agreed upon by the data providers based on their observation of their part of the dataset.

The minimum values for the learning rate a and elastic rate p are limited by the scale $\Delta$, and if they are too small the system might not have enough precision to handle their multiplication with the input data.

Data Outsourcing

SPINDLE's protocols work seamlessly with data providers that have their input data X in cleartext, and with DPs that obtain data $\langle X\rangle_{pk}$ encrypted under the public collective key from their respective data owners. As such, SPINDLE enables data storage and computation outsourcing to untrusted cloud providers that offer strong computation capabilities and that are always available. It is assumed that the preparation phase (PREPARE) has been performed by the data owners who generate the collective public key, agree on the parameters, standardize their data and outsource them encrypted and pre-formatted for specific tasks, e.g., $X^T$ is already computed. Then, the remaining training phases are executed by the entities that obtain the out-sourced data. However, we note that operating on encrypted input data impacts the complexity of MAP, as all the multiplication operations (Protocol 2) would happen between ciphertexts, and would therefore require a relinearization operation (Relin(·)).

This is, in contrast with the case of cleartext data at their respective DPs, where ciphertext-ciphertext multiplications only occur during the computation of the activation function, with the preceding operations being cleartext-ciphertext multiplications.

Model Release

By default, the trained global model in SPINDLE is kept secret from any entity and still enables privacy-preserving predictions on (private) evaluation data input by the querier (offering end-to-end model confidentiality). Nonetheless, if required by the application setting, SPINDLE can enable the revelation of the trained model to the querier or a set of entities. This is achieved by performing a DKeySwitch(·). Thus, the data providers can collaborate to obliviously re-encrypt the trained model weights (which are encrypted under their collective key) with a different public key, e.g., the querier's key. Alternatively, the data providers can collectively decrypt (DDec(·)) the trained model and publicly release it. In such cases, model confidentiality is only assured until the end of the training.

The invention claimed is:

1. A computer-implemented method for privacy-preserving distributed training of a global machine learning model (global model)-referred to as global model-on a plurality of distributed datasets, wherein a plurality of data providers are communicatively coupled, each data provider having:
    a respective local machine learning model (local model) and a respective local training dataset for training the local model using an iterative training algorithm, and
    cryptographic keys including a portion of a cryptographic distributed secret key and a corresponding collective cryptographic public key (collective public key) of a multiparty fully homomorphic encryption scheme, with the local model being encrypted with the collective public key,
    wherein the cryptographic keys are collectively initialized by the plurality of data providers, and the local models and local training datasets of all data provider systems adhere to the same structure and data formats and use the same training parameters, and the plurality of all local training datasets represents a global training dataset for the global model, and the global model also being encrypted with the collective public key, the method comprising:
    for a predefined maximum number of global iterations:
    each data provider training its local model using the respective local training dataset by executing a predefined number of local iterations of an iterative training algorithm for its local model to generate an updated local model, and combining the updated local model with the current global model into a current local model, and providing the current local model to at least a subset of the data providers;

homomorphically combining at least a subset of the current local models by at least one of the subset of data providers into a combined model; and updating, by the at least one data provider of the subset of data providers, the current global model based on the combined model to generate an updated global model;

providing, by the at least one data provider of the subset of data providers, the updated global model to at least a subset of the other data providers of the plurality of data providers.

2. The method of claim 1, further comprising:

a particular data provider of the plurality of data providers receiving, from a querying entity, input data encrypted with the collective public key, and receiving a destination public key of a destination entity, the destination entity being the recipient of a prediction result to be provided in response to the input data;

in response to the input data, obtaining one or more corresponding encrypted prediction values by applying the encrypted global model to the encrypted input data; and switching the one or more encrypted prediction values to the destination public key, and providing the switched one or more encrypted prediction values to the querying entity so that only the destination entity can decrypt the one or more encrypted prediction values.

3. The method of claim 1, further comprising:

switching the updated global model to one or more destination public keys of one or more destination entities, and providing the one or more switched global models to respective destination entities for obtaining the corresponding decrypted global model.

4. The method of claim 1, wherein the local and global machine learning models are implemented by feed-forward neural networks with one or more hidden layers wherein the one or more hidden layers comprise only activation functions that can be approximated by a polynomial function.

5. The method of claim 4, wherein each machine learning model comprises a single hidden layer made of one node that defines an activation function according to a generalized linear model, where the combination of a feature matrix X and a weights vector w is related to a vector of class labels y by the activation function $\sigma$ such that $E(y)=\sigma^{-1}(Xw)$, where $E(y)$ is the mean of y.

6. The method of claim 5, wherein the type of the generalized linear model is any of: linear regression, logistic regression, and multinomial logistic regression.

7. The method of claim 1, wherein the multiparty fully homomorphic encryption scheme is a quantum-resistant cryptographic scheme relying on parallel computations, single-instruction-multiple-data (SIMD) operations, and optimized polynomial approximations of the activation functions of the machine learning models.

8. The method of claim 1, wherein at least a subset of the local training datasets is also encrypted with the collective public key.

9. The method of claim 1, wherein homomorphically combining the current local models is performed ascending a tree structure, such that each data provider aggregates its current local model with current local models of its children, and sends the aggregate result to its parent so that the data provider at the root of the tree structure—the root data provider—obtains the updated global model combined from all current local models; and wherein updating is performed by the root data provider.

10. A distributed computer system for privacy-preserving distributed training of a global machine learning model (global model) on a plurality of distributed datasets, the system comprising:

a plurality of data provider computer systems being communicatively coupled such that each data provider computer system can exchange information with any other data provider computer system, wherein each data provider computer system has a respective local machine learning model (local model) and a respective local training dataset for training the local model using an iterative training algorithm, and has cryptographic keys including a portion of a cryptographic distributed secret key and a corresponding collective cryptographic public key (collective public key) of a multi-party fully homomorphic encryption scheme, with the local model being encrypted with the collective public key, the cryptographic keys being collectively initialized by the plurality of data provider computer systems, and the local models and local training datasets of all data provider computer systems adhering to the same structure and data formats and using the same training parameters, and the plurality of all local training datasets representing a global training dataset for the global model, the global model also being encrypted with the collective public key;

wherein each data provider computer system is configured to train its local model using the respective local training dataset by executing a predefined number of local iterations of an iterative training algorithm for its local model to generate an updated local model, and combining the updated local model with the current global model into a current local model, and to provide the current local model to at least a subset of the data provider computer systems; and wherein at least one data provider computer system of the subset of data provider computer systems is configured to homomorphically combine at least a subset of the current local models into a combined model, and to update the current global model based on the combined model to generate an updated global model, and provide the updated global model to at least a subset of the other data provider computer systems of the plurality of data provider computer systems after a number of global iterations of global model updates which does not exceed a predefined maximum number of global iterations.

11. The system of claim 10, wherein a particular data provider computer system of the plurality of data provider computer systems is configured:

to receive, from a querying entity, input data encrypted with the collective public key, and to receive a destination public key of a destination entity, the destination entity being the recipient of a prediction result to be provided in response to the input data; and in response to the input data, to obtain one or more corresponding encrypted prediction values by applying the encrypted global model to the encrypted input data; and to switch the one or more encrypted prediction values to the destination public key, and to provide the switched one or more encrypted prediction values to the querying entity so that only the destination entity can decrypt the one or more encrypted prediction values.

12. The system of claim 10, wherein:

at least a subset of the plurality of data provider computer systems is configured:

to collectively switch the updated global model to one or more destination public keys of one or more destination entities, and to provide the one or more switched global models to respective destination entities for obtaining the corresponding decrypted global model.

13. The system of claim 10, wherein the machine learning models are implemented by feed-forward neural networks with one or more hidden layers wherein the one or more hidden layers comprise only activation functions that can be approximated by a polynomial function.

14. The system of claim 13, wherein each machine learning model comprises a single hidden layer made of one node that defines an activation function according to a generalized linear model, where the combination of a feature matrix X and a weights vector w is related to a vector of class labels y by the activation function $\sigma$ such that $E(y) = \sigma^{-1}(Xw)$, where $E(y)$ is the mean of y, wherein the type of the generalized linear model is any of: linear regression, logistic regression, and multinomial logistic regression.

15. The system of claim 10, wherein the multiparty fully homomorphic encryption scheme is a quantum-resistant cryptographic scheme relying on parallel computations, single-instruction-multiple-data (SIMD) operations, and optimized polynomial approximations of the activation functions of the machine learning models.

* * * * *